(12) United States Patent
Kawasaki et al.

(10) Patent No.: US 6,338,428 B1
(45) Date of Patent: Jan. 15, 2002

(54) VEHICLE ROOF RACK

(75) Inventors: Michiharu Kawasaki; Yoshihiro Takemoto, both of Higashihiroshima (JP)

(73) Assignee: GP Daikyo Corporation, Hiroshima (JP)

(*) Notice: Subject to any disclaimer, the term of this patent is extended or adjusted under 35 U.S.C. 154(b) by 0 days.

(21) Appl. No.: 09/672,390

(22) Filed: Sep. 28, 2000

(30) Foreign Application Priority Data

Sep. 30, 1999 (JP) .......................................... 11-279076

(51) Int. Cl.⁷ .................................................. B60R 9/00
(52) U.S. Cl. ...................................... 224/326; 224/309
(58) Field of Search ............................... 224/309, 325, 224/326, 327

(56) References Cited

U.S. PATENT DOCUMENTS

| | | | | |
|---|---|---|---|---|
| 5,622,298 A | * | 4/1997 | Cucheran et al. ............ | 224/326 |
| 5,765,737 A | * | 6/1998 | Cucheran et al. ............ | 224/326 |
| 5,855,840 A | * | 1/1999 | Cucheran et al. ............ | 264/572 |
| 6,250,528 B1 | * | 6/2001 | Lumpe et al. ............... | 224/326 |
| 6,272,894 B1 | * | 8/2001 | Hudson et al. ................ | 72/61 |

FOREIGN PATENT DOCUMENTS

JP    10-129359    5/1998

* cited by examiner

*Primary Examiner*—Stephen K. Cronin
(74) *Attorney, Agent, or Firm*—Merchant & Gould P.C.

(57) ABSTRACT

A vehicle roof rack can be made by insert molding so that the outside is coated with synthetic resin. The support bracket cores can be manufactured easily, shape and dimensional precision can be easily controlled, and reinforcing ribs can be provided while avoiding appearance defects and supplying resin to the mold from a gate on only one side. The core used for insert molding includes the rail core member of the roof rack and the core of the support bracket for mounting the roof rack to the vehicle. The support bracket core is synthetic resin, manufactured as an integral molding having pilot holes through which screws are passed for attaching the support bracket core to the rail core, and mounting bolts for mounting the support brackets and roof rack to the vehicle.

6 Claims, 32 Drawing Sheets

VEHICLE ROOF RACK

BACKGROUND OF THE INVENTION

1. Field of the Invention

The present invention relates to a vehicle roof rack formed by coating a core member with synthetic resin using an insert molding technique.

2. Description of Related Art

One type of roof rack installed on top of the roof of passenger cars and other vehicles is often manufactured by an insert molding process. In this process the metal core member of the roof rack is placed in the mold at a specific position and molten resin is then injected to fill the mold cavity and coat at least a specific surface area of the core member with synthetic resin.

By manufacturing the roof rack in this way, the strength and rigidity required in a roof rack is assured by the metal core member while coating all or a particular area of the surface of the core member with synthetic resin reduces the overall weight and improves the appearance of the roof rack. Insert molding also results in an integral molding of the coating resin and core, thereby helping to reduce the number of parts in the complete roof rack assembly, eliminating an additional step of assembling the coating and core, and improving adhesion between the coating and core.

The applicant previously invented a method for inserting and securing the core in the mold during insert molding of this type of roof rack. More specifically, the method the applicant disclosed in Japanese Patent Laid-Open Publication HEI 10-129359 applies to a roof rack assembly in which the core of the rack rail extending longitudinally to the vehicle, and the core of the support bracket for mounting the rail to the vehicle roof, are made of metal. The support bracket cores and the rack rail core are first fastened together, and the support bracket cores are then placed in the mold at a specific position using an intervening insert. The complete core assembly is thus inserted to and secured inside the mold.

Changes in owner preferences and aesthetics have led to various changes in vehicle design and appearance. Not only have these changes affected the roof rack installed on the vehicle roof top, they have also made the structure for installing the roof rack more complex in the pursuit of a vehicle that looks better even with a roof rack installed.

One stylistic change in car design has been to rounded edges and a rounded roof. Installing a roof rack on a rounded roof has meant that the support brackets must be offset noticeably to the outside or inside from the conventional position directly vertically below the rack rail. As shown in FIG. 40 to FIG. 42, this requires a bend in the support bracket metal cores 230, 240, 250 at some point along the vertical axis thereof. The top of each support bracket metal core 230, 240, 250 is then joined with a pipe-shaped rail core 220, thus assembling core member 210 so that the mounting bolt 208 affixed to the bottom of each support bracket metal core 230, 240, 250 is positioned to the outside, for example, of the axis of the pipe-shaped rail core 220 of the roof rack.

A problem with this design is that because of the high precision required when bending and forming the support bracket metal cores 230, 240, 250, production is time-consuming and it is quite difficult to maintain the required shape and dimensional precision.

It should be noted that the support bracket metal cores 230, 240, 250 could be formed in the shape of closed boxes so that molten resin is prevented from filling the inside of the box and the box thus stays hollow. This reduces the amount of resin used and keeps the weight down. The problem with this technique is that it is even more difficult and relatively expensive to produce such box-like metal core members. It is particularly difficult to form the metal core members as closed boxes when a bend is required as described above, and it is therefore difficult in practice to prevent resin from filling the core members and thus keep weight down by controlling the resin amount.

The roof rack rails are also long and relatively slender with the length significantly long in relation to the cross sectional area. It is therefore standard practice to use three support brackets, referred to as the front, center, and rear supports, on each rail. Due to vehicle design considerations, however, the center support is often noticeably offset from the actual center, typically toward the rear support, for example.

The resulting long span between the front support and the center support means that the distance between the fixed points at which the pipe-shaped core 220 is supported is also long. As a result, when molten resin R' is injected during the insert molding process, resin pressure can cause the long unsupported length of pipe-shaped core 220 between front and center supports to bend and shift in position.

Because it is very difficult to inject and fill resin R' evenly throughout the mold cavity, forcibly injecting resin to the mold cavity results in an uneven distribution of resin pressure, thus causing the position of pipe-shaped core 220 to shift and the thickness of coated resin layer R' to become uneven. There are also adverse effects on the bond between coating resin R' and the surfaces of core members 210, 230, 250. Adhesion to the core member 210 is particularly low where coating resin R' thickness is thin, and appearance defects such as blistering can occur easily.

It should also be noted that roof rack rails are installed in pairs. Manufacturing would therefore be much more efficient and molding easier if the roof rack rail assemblies could be molded in pairs at the same time in the same mold (using multipart molding). The problem with molding two components in a single mold assembly is that using plural gates to supply resin for each molding (roof rack) complicates mold design and makes it more difficult to control molding conditions.

It would therefore be convenient if a single gate common to both die units could be provided between two parallel roof rack mold sections to supply molten resin simultaneously from this one gate to the pair of roof rack molds.

As will be well understood from FIGS. 41 and 42, however, a hood-shaped coating resin layer R' is formed covering the top of pipe-shaped core 220 in roof rack 201 and descending therefrom to both sides. The distance from the bottom on the right side of coating resin layer R' up and over the top and back down to the bottom on the left side is thus very long in the direction through the vertical section perpendicular to the long axis of pipe-shaped core 220. Furthermore, when resin is supplied from only one side of the mold using a single gate and the thickness of coating resin layer R' is limited to some maximum thickness in order to minimize weight, it is difficult to assure that the molten resin completely fills the mold cavity all the way to the lower end of the resin layer at the farthest point from the runner extend from the gate.

Furthermore, ribs 288 are desirably added to the support brackets for reinforcement due to the length of the roof rack 201 itself and the limited thickness of the coating resin layer R' forming the outside walls of the finished molding (roof rack 201). However, if these ribs 288 exceed a particular thickness, appearance defects known as sink marks can occur easily on the surface where the ribs 288 join the coating resin layer R'. It is therefore necessary to limit the thickness of the ribs 288.

However, if the ribs are too thin, a drop in molten resin filling characteristics in the area of the ribs during injection molding means that tall ribs (ribs with a large surface area) cannot be formed. In practice this means that ribs cannot be formed to the full height of the roof rack 201, and are thus limited in height as indicated by the double-dot dash lines in FIGS. 41 and 42. The problem with such low ribs 288 is that they cannot provide sufficient reinforcement for the coating resin layer R' (outer walls of the product).

The present invention was conceived with respect to the aforementioned problems, and an object of the invention is to provide a vehicle roof rack manufactured by insert molding such that manufacturing and controlling the precision of the support bracket core are simple and appearance defects can not easily occur, and resin can be supplied to the insert mold from only one side, or ribs that can provide solid reinforcement can be formed.

SUMMARY OF THE INVENTION

To achieve this object, a vehicle roof rack according to the present invention has a vehicle mounting bracket and a rack rail extending longitudinally to the vehicle body on top of the vehicle roof, the roof rack being formed by placing a core in a specific location inside a mold cavity and injecting molten resin to the mold cavity to form a synthetic resin coating on at least a specific surface area of the core. The core of this roof rack includes a rail core as the core of the rack rail, and a support bracket core as the core of the mounting bracket. The support bracket core is integrally molded from synthetic resin to include a mechanism for fastening the support bracket core to the rail core and a mechanism for fastening the roof rack to the vehicle.

By manufacturing the support bracket core, which is the core of the roof rack support bracket, from synthetic resin, the support bracket cores can be manufactured in large volume with uniform quality using a molding process whereby a molding die is filled with molten resin. Compared with conventional bending and shaping of a metal member, production is significantly better, and it is easier to maintain shape and dimensional precision.

Furthermore, because the mechanism for fastening the support bracket core to the rail core and the mechanism for fastening the roof rack to the vehicle are integrally molded together, the structure of the support bracket core can be simplified and productivity can be further improved.

Yet further, adhesion of the resin coating is also greatly improved compared with a conventional metal support. As a result, separation of the resin coating from the support core surface is more difficult even when the resin coating is thin, and appearance defects such as blistering of the resin coating can be suppressed.

Preferably, the mechanism for fastening the support bracket core to the rail core is a through-hole through which a threaded member is passed to fasten the support bracket core to the rail core, and the mechanism for fastening the roof rack to the vehicle is a bolt having a threaded shaft protruding from a support bracket core base bottom that is fastened to the vehicle.

When the mechanism formed in the support bracket core for fastening the support bracket core to the rail core is a through-hole through which a threaded member such as a screw can be passed to fasten the support bracket core to the rail core, it is yet further possible to easily and reliably fasten the support bracket core and the rail core together using a simple screw.

Furthermore, by using an embedded bolt of which the threaded shaft protrudes from the bottom of the support bracket core base fastened to the vehicle as the mechanism for attaching the roof rack to the vehicle, the support bracket core and roof rack can be easily and reliably attached to the vehicle by simply threading and tightening a nut onto the exposed bolt threads.

Further preferably, a recess is formed to a specific depth from a specific bottom reference surface of the support bracket core so that this recess is connected to the resin supply runner of the molding die, and said through-hole is formed in a inside wall of the recess.

In this case, further preferably, the through-hole for the threaded member is provided through the bottom wall of a recess of a specific depth from a specific bottom reference surface of the support bracket core. This makes it simple to insert and tighten the threaded member from the recess.

In addition, because this recess also communicates with the resin supply runner of the mold, the recess can be easily filled with resin when the support bracket core and rail core are fastened together by the threaded member and the coating resin is then supplied to and fills the mold cavity. The head of the threaded member is also covered by the filler resin, thus preventing corrosion of the threaded member and preventing the threaded member from loosening due to vehicle vibration.

Yet further preferably, the support bracket core is held in the mold using an insert, and a resin path is also formed in part where the support bracket core and insert contact. This resin path connects end parts of a mold cavity nearest and farthest from the resin supply runner when seen in vertical section perpendicular to the longitudinal axis of the rail core, and the mold cavity is formed between an outside surface of the support bracket core and an inside surface of the molding die.

In this case, yet further preferably, the support bracket core is held in the molding die using an insert. The force required to secure the long rail core thus does not act directly on the rail core, and the resulting deflection and deformation of the rail core can thus be prevented.

When seen in vertical section perpendicular to the longitudinal axis of the rail core, a resin path connecting the near and far end parts of the mold cavity, which is formed between the outside surface of the support bracket core and the inside surface of the molding die, from the resin supply runner is also formed in part where the support bracket core and insert contact. It is therefore possible to assure that the molten resin flows relatively easily and reliably through this resin path to the far side of the mold cavity from the resin supply runner. This means that the resin supply gate can be is provided on only one side of the support bracket core while still assuring that the molten resin flows reliably from the gate throughout the mold cavity, including to the end farthest from the gate.

A vehicle roof rack according to another version of the invention has a vehicle mounting bracket and a rack rail extending longitudinally to the vehicle body on top of the vehicle roof, the roof rack being formed by placing a core in a specific location inside a mold cavity and injecting molten resin to the mold cavity to form a synthetic resin coating on at least a specific surface area of the core. The core includes a rail core as the core of the rack rail, and a support bracket core made of synthetic resin as the core of the mounting bracket, and has a plurality of ribs disposed integrally thereto connecting the support bracket core body and the resin coating formed as the outside cover of the roof rack. The mold cavity part corresponding to the ribs as seen in vertical section perpendicular to the longitudinal axis of the rail core communicates with the resin supply runner part of the molding die.

By manufacturing the support bracket core, which is the core of the roof rack support bracket, from synthetic resin, the support bracket cores can be manufactured in large volume with uniform quality using a molding process whereby a molding die is filled with molten resin. Compared with conventional bending and shaping of a metal member, production is significantly better, and it is easier to maintain shape and dimensional precision.

A plurality of ribs connecting the resin coating functioning as the outside wall of the roof rack, and the body of the support bracket core, is further preferably provided. These ribs assure the strength and rigidity required in the roof rack while keeping the support bracket core compact and lightweight. This means that a lightweight roof rack can also be achieved.

The mold cavity corresponding to these ribs when seen in vertical section perpendicular to the longitudinal axis of the rail core is also connected to the resin supply runner of the molding die. This makes it possible to supply and fill the mold cavity with molten resin from this part during insert molding, assure sufficient bond strength between the ribs and outside wall of the roof rack, and thus increase the strength and rigidity of the support bracket.

Preferably in this case the ribs are formed integrally to and projecting out from the support bracket core body.

The thickness of the ribs also has no effect on the appearance of the outside of the roof rack because the ribs project from the body of the support bracket core and are formed integrally to the support bracket core body. That is, even if rib thickness is increased for reinforcement to improve the rigidity and strength of the outside wall of the roof rack, sink marks or other visual defects will not form in the roof rack wall area connected to the ribs as a result of increased rib thickness, and appearance will therefore not be degraded.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures.

Embodiment 1

Figure 1:
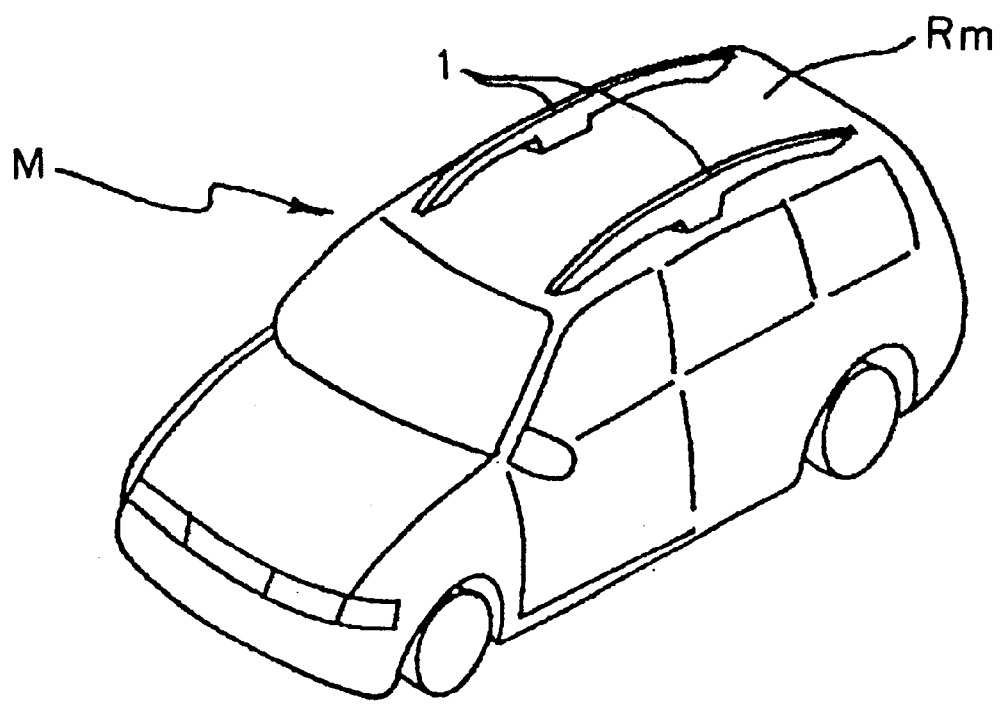
FIG. 1 is an oblique view of a vehicle equipped with a roof rack according to a first preferred embodiment of the invention.
Figure 2:
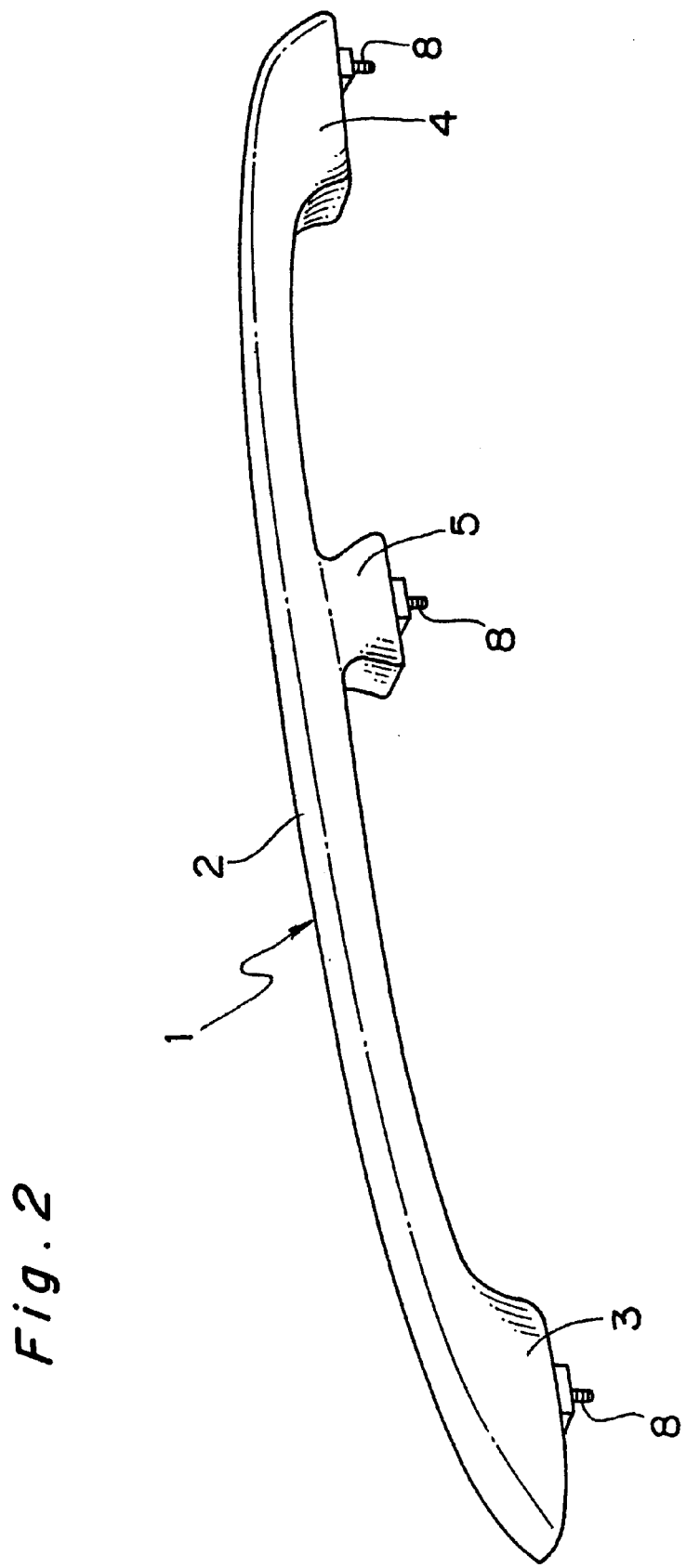
FIG. 2 is an oblique view of the roof rack in FIG. 1.

FIG. 1 is an overview of an automobile M equipped with a roof rack 1 according to a first preferred embodiment of the invention. As shown in this figure roof rack 1 includes a pair of members installed on two sides on top of the vehicle roof Rm. As will be known from FIG. 2, each roof rack 1 comprises a rail 2 typically running substantially parallel to the long side of the vehicle (that is, front to back), and a plurality of support brackets for attaching the roof rack 1 to the vehicle roof Rm. The roof rack 1 shown in FIG. 2 according to this preferred embodiment has three support brackets, referred to herein as front support 3, rear support 4, and center support 5. The outside of roof rack 1 is covered with a synthetic resin skin.

While the three supports 3, 4, 5 are disposed along the length of roof rack 1, center support 5 is not positioned in the middle between front support 3 and rear support 4, but is rather offset noticeably toward the rear support 4. This is because for design considerations the span between front support 3 and center support 5 is desirably longer than the span between center support 5 and rear support 4. It should be further noted that a mounting bolt 8 for mounting roof rack 1 to vehicle roof Rm is integrally disposed to the bottom of each support 3, 4, 5.

Roof rack 1 is manufactured by insert molding. The core members are placed in the mold cavity at a specific position, and molten resin is then injected to the mold cavity to coat at least a specific surface area of the core members with synthetic resin.

Figure 3:
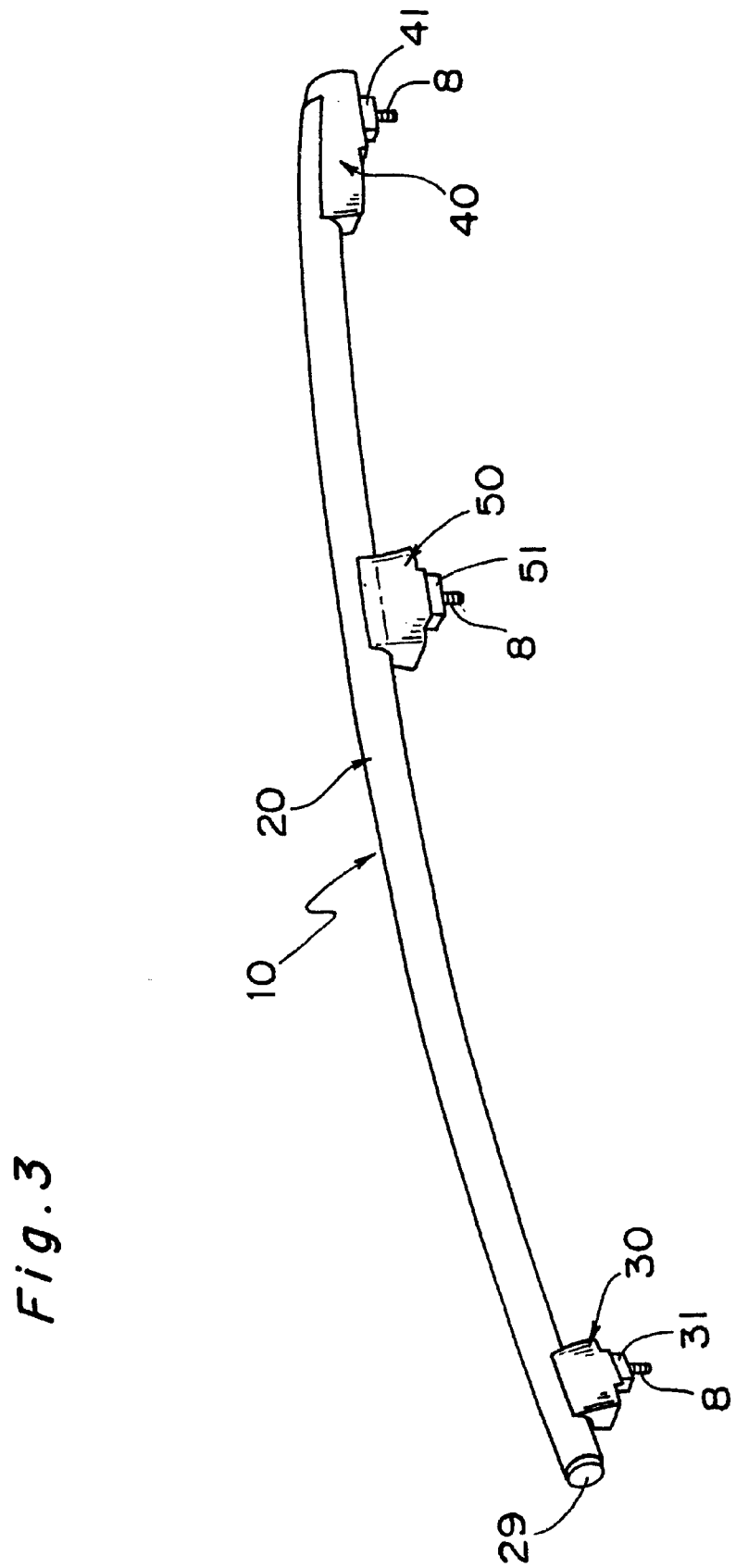
FIG. 3 is an oblique view of the core assembly of the roof rack in FIG. 1.

As shown in FIG. 3, the core members of this roof rack 1 include the pipe-shaped rail core 20, which is the core of rail 2, and support bracket cores 30, 40, 50, which are the cores of supports 3, 4, 5, respectively. The support bracket cores 30, 40, 50 are attached to the rail core 20 to complete the core assembly 10. It should be noted that a mounting bolt 8 is integrally fixed to the bottom of each support bracket core 30, 40, 50. The rear end of rail core 20 is closed by rear support bracket core 40, but the front end is closed by a disk-shaped plug 29.

It should be noted that, in this embodiment of the invention, support bracket cores 30, 40, 50 are synthetic resin moldings and are not made of metal. The synthetic resin used for support bracket cores 30, 40, 50 is most preferably a fiber reinforced synthetic resin containing a reinforcing fiber such as glass fiber or carbon fiber. In this exemplary embodiment the synthetic resin material used for support bracket cores 30, 40, 50 is polypropylene (PP) resin, a thermoplastic resin, containing 35% to 45% glass fiber with a fiber length of 5 mm to 8 mm. The reinforcing glass fiber length is further preferably 8 mm, and also preferably the glass fiber content is approximately 40%.

The structure of the support bracket cores 30, 40, 50 is further described next.

Figure 4:
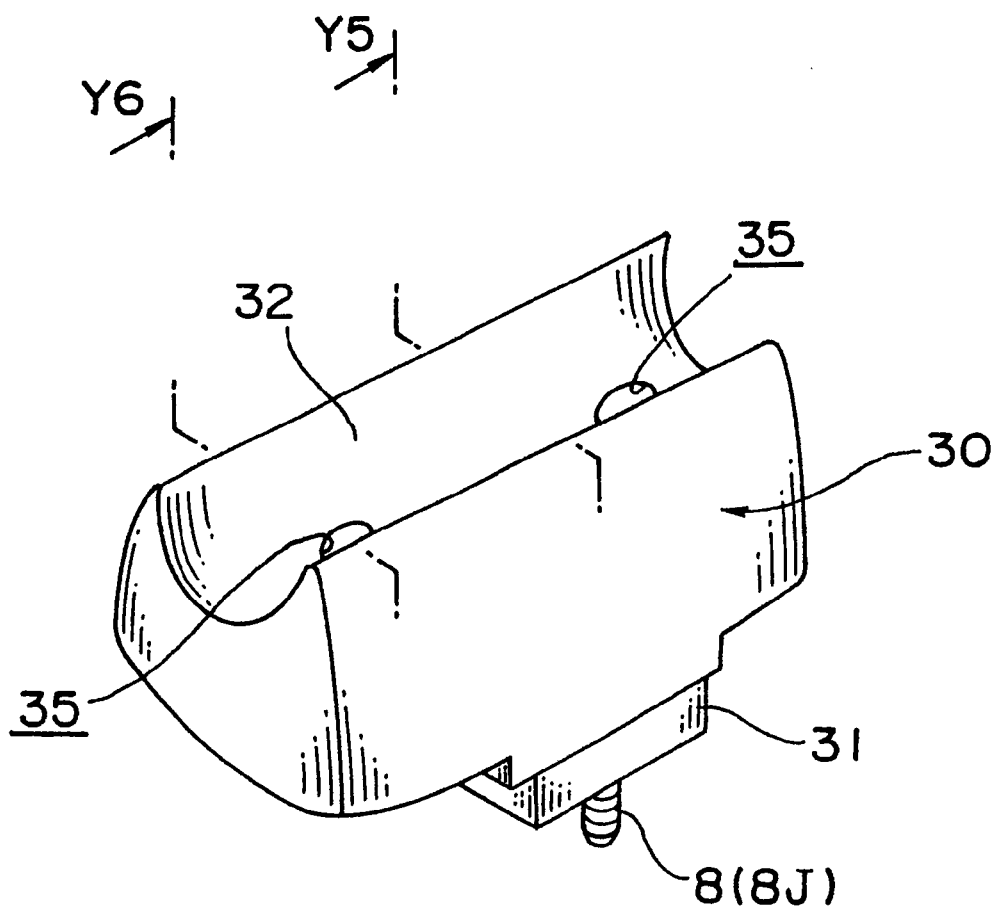
FIG. 4 is an oblique view of the front support bracket core of the core assembly in FIG. 3.
Figure 5:
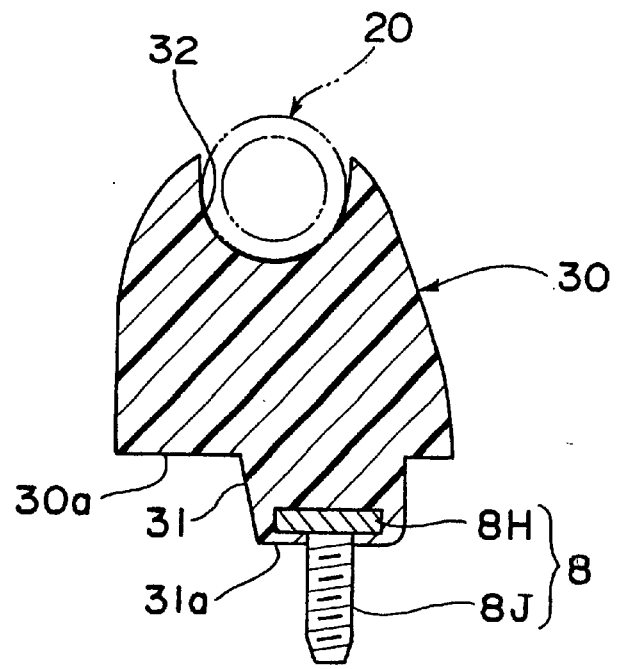
FIG. 5 is a vertical section through Y5—Y5 in FIG. 4.
Figure 6:
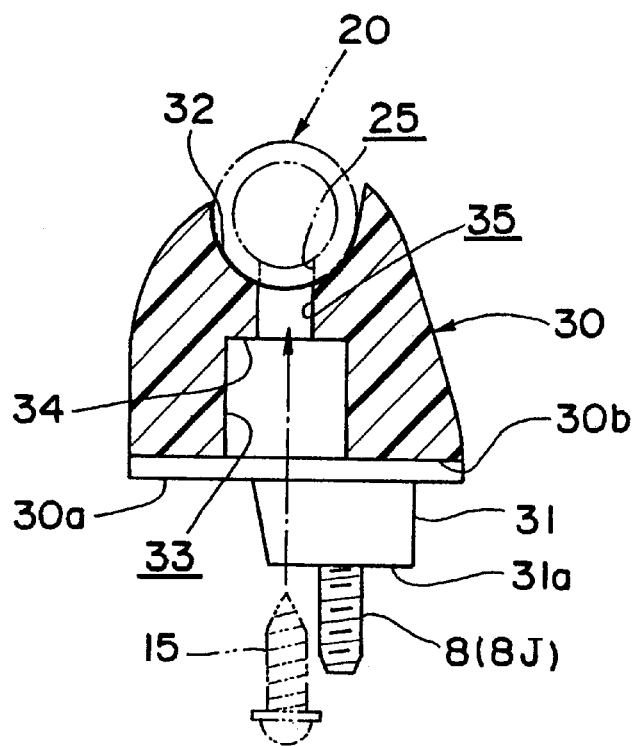
FIG. 6 is a vertical section through Y6—Y6 in FIG. 4.

Support bracket core member 30 for the front support 3 is described first with reference to FIG. 4 to FIG. 6. As shown in these figures, front support bracket core 30 has a core base 31 and a rail holder 32. The core base 31 is the base for securing roof rack 1 to vehicle roof Rm, and rail holder 32 accepts and secures the pipe-shaped rail core 20.

Core base 31 protrudes a specific height from core bottom 30a at approximately the longitudinal (front to back direction) middle of front support bracket core 30. Shoulders 30b rising a specific amount from core bottom 30a are formed at the front and back of core bottom 30a.

Mounting bolt 8 for mounting roof rack 1 to vehicle roof Rm is integrally fastened to core base 31 with head 8H thereof embedded in core base 31 and the shaft (threads) 8J protruding perpendicularly from flat bottom surface 31a of core base 31. It should be noted that this mounting bolt 8 is equivalent to the mechanism for mounting the roof rack to the vehicle of the accompanying claims.

By thus using a mounting bolt 8 as the mechanism for fastening roof rack 1 to vehicle roof Rm, front support bracket core 30 can be easily and reliably fastened to vehicle roof Rm by simply threading and tightening a nut (not shown in the figure) onto threads 8J protruding from bottom 31a of core base 31.

Due to the desire to improve the appearance when roof rack 1 is installed on vehicle roof Rm, the position at which front support 3 is fastened to vehicle roof Rm (more specifically, the position of mounting bolt 8 of front support bracket core 30) is offset, in this preferred embodiment, from vertically below the axis of rail 2 (that is, the axis of rail core 20) to a position noticeably to the outside or inside of said axis in the widthwise direction of the vehicle.

It should be noted that this widthwise offset from the axis of rail 2 in the position at which each support bracket is fastened applies not only to front support 3, but is basically the same for rear support 4 and center support 5.

Fixing mounting bolt 8 to core base 31 is accomplished by inserting and fastening the bolt when molding of the front support bracket core 30.

That is, an insert molding process is used for molding front support bracket core 30. Mounting bolt 8 is set with the head 8H positioned in the molding die at a specific location corresponding to the core base 31. Molten resin is then injected to the mold cavity to integrally mold and fix mounting bolt 8 to core base 31 (more specifically, to front support bracket core 30) with threads 8J protruding from bottom surface 31a of core base 31 (more specifically, from the bottom surface of front support bracket core 30).

It should be noted that the same basic structure and method used to fasten mounting bolt 8 to front support bracket core 30 are used to fasten mounting bolt 8 to rear support bracket core 40 and center support bracket core 50.

A recess 33 of a specific depth from core bottom 30a is provided in front and back of core base 31. Referring to the front recess 33, located at the bottom left as seen in FIG. 4, by way of example, a through-hole 35 for a threaded member for securing and fastening front support bracket core 30 to rail core 20 is formed through the inside wall 34 of the recess 33. See FIG. 6.

A self-tapping screw 15 is used as this threaded member in this preferred embodiment of the invention. The through-hole 35 is therefore formed as a pilot hole with an internal dimension appropriate to the self-tapping screw 15. It should be noted that the pilot hole for self-tapping screw 15 is equivalent to the mechanism of the accompanying claims for mounting the support bracket core to the rail core.

A pilot hole 25 of an internal diameter appropriate to self-tapping screw 15 is also formed in rail core 20. Rail core 20 and front support bracket core 30 are thus assembled with rail holder 32 of front support bracket core 30 supporting rail core 20 so that the centers of these pilot holes 25 and 35 are aligned. Self-tapping screw 15 is then positioned with and threaded into through-hole 35 from below recess 33 of front support bracket core 30, thereby easily and reliably connecting and fastening front support bracket core 30 to rail core 20. It should be noted that front support bracket core 30 is fastened at both the front and back sides of core base 31 to rail core 20.

It should be further noted that this structure for attaching front support bracket core 30 to rail core 20 is also basically the same in rear support bracket core 40 and center support bracket core 50.

It will be obvious that assembling support bracket cores 30, 40, 50 to rail core 20 to form the core assembly 10 shall not be limited to using self-tapping screws 15. For example, it is also possible to attach the support bracket cores to the rail core using a bolt fixed to the rail core and a nut sized so that it can be tightened from the bottom of the recess in the support bracket core. This can be accomplished by fastening the bolt member to the rail core so that the bolt threads protrude from the outside in the radial direction of the rail core, inserting the bolt so that the threads thereof protrude inside the bolt hole formed in the inside wall 34 of the support bracket core, and then threading the nut from the bottom side of the recess onto the threads exposed inside the recess.

The core 40 of the rear support 4 is described next below with reference to FIG. 7 to FIG. 9.

It should be noted that the basic structure of this rear support bracket core 40 and the center support bracket core 50 described next below is the same as that of the front support bracket core 30 noted above. As also noted above, the offset in the mounting position of the support bracket widthwise to the axis of the rail 2, the structure and method for fastening mounting bolt 8 to the support bracket core, and the structure for fastening the support bracket core to the rail core 20, are also basically the same as those of the front support bracket core 30 noted above. The following explanations of the rear support bracket core 40 and then the center support bracket core 50 therefore focus primarily on the differences between these and front support bracket core 30.

Figure 7:
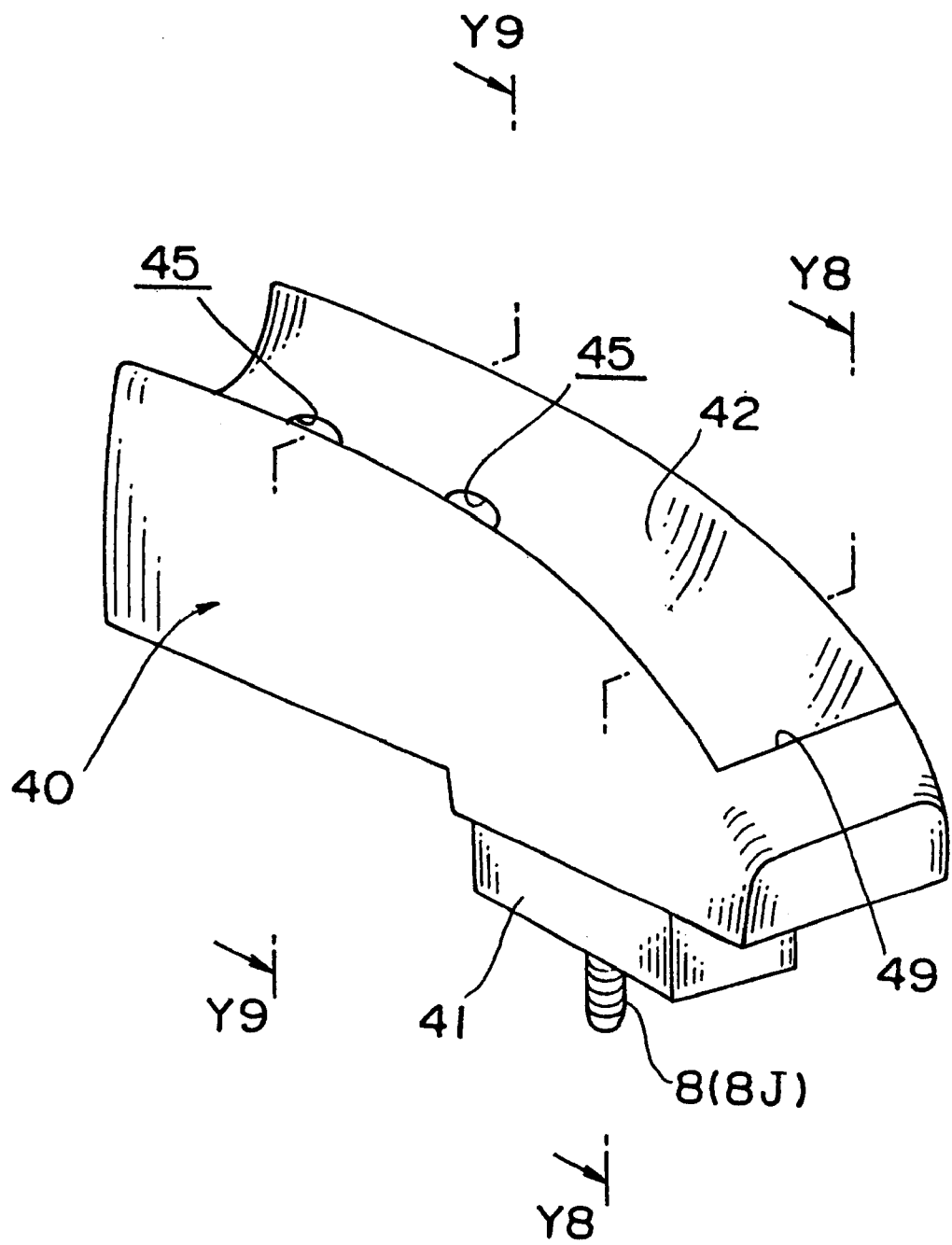
FIG. 7 is an oblique view of the rear support bracket core of the core assembly in FIG. 3.
Figure 8:
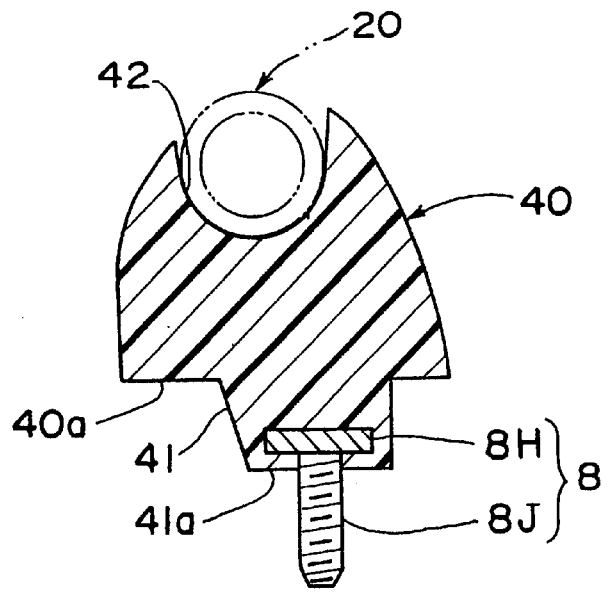
FIG. 8 is a vertical section through Y8—Y8 in FIG. 7.
Figure 9:
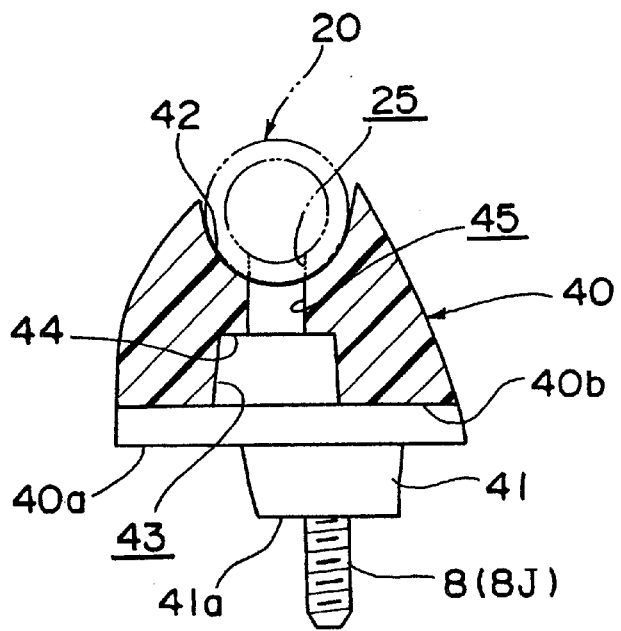
FIG. 9 is a vertical section through Y9—Y9 in FIG. 7.
Figure 10:
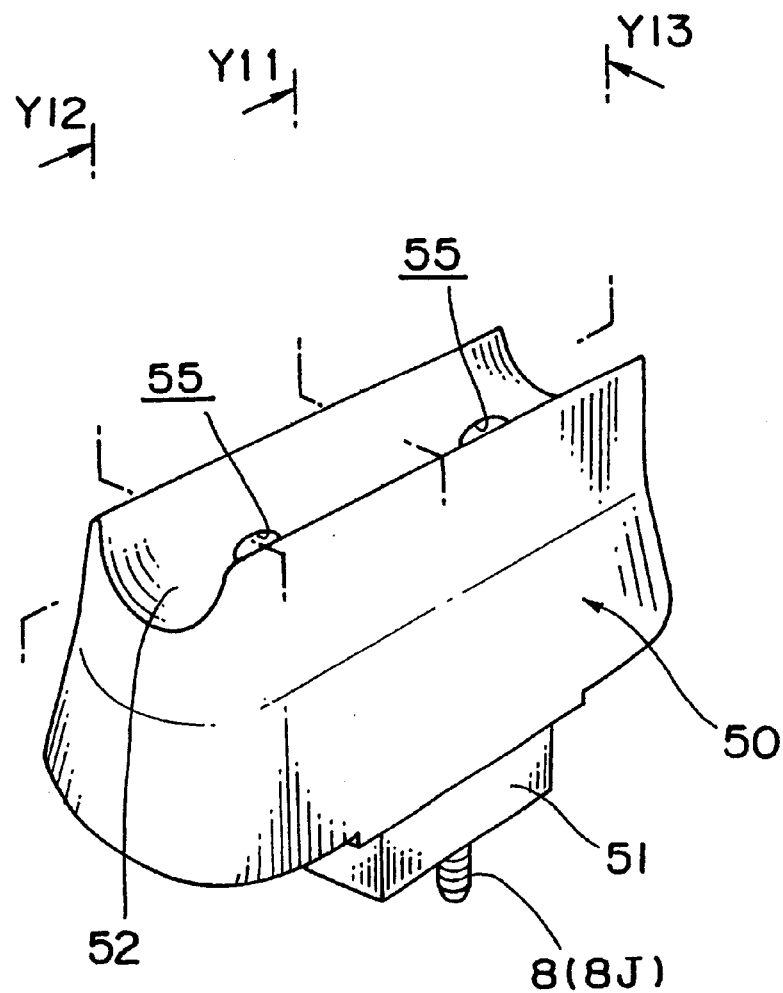
FIG. 10 is an oblique view of the center support bracket core of the core assembly in FIG. 3.
Figure 11:
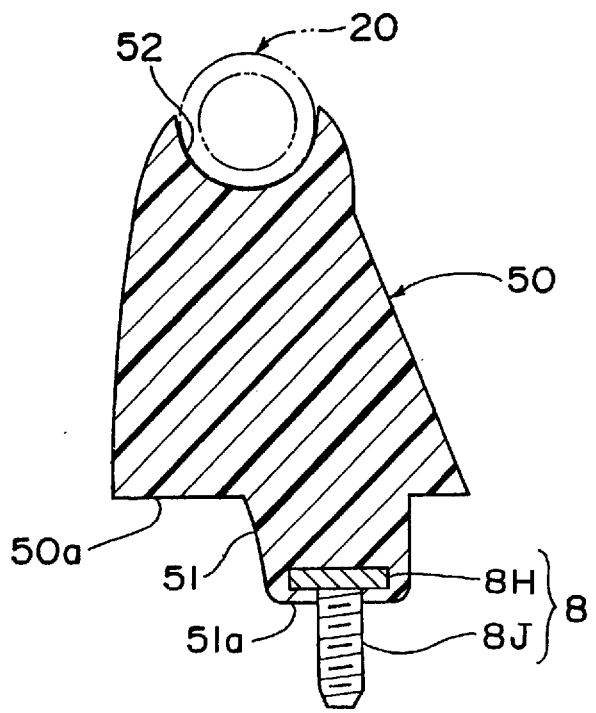
FIG. 11 is a vertical section through Y11—Y11 in FIG. 10.
Figure 12:
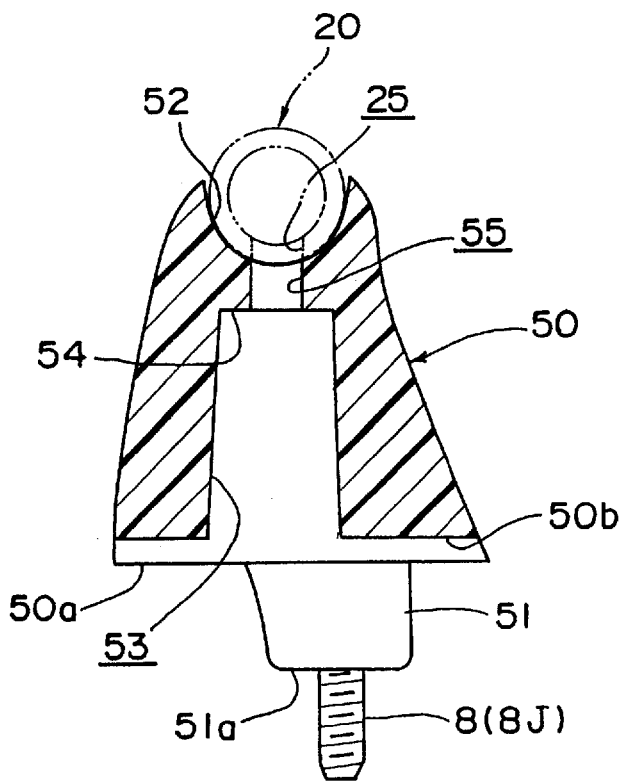
FIG. 12 is a vertical section through Y12—Y12 in FIG. 10.

As shown in FIG. 7 to FIG. 9, core bottom 40a is formed at the back end part of rear support bracket core 40. Core base 41, which is the base for securing roof rack 1 to vehicle roof Rm and has a flat bottom 41a, protrudes a specific height from core bottom 40a near the back end of rear support bracket core 40. Two pilot holes 45 for tapping are therefore disposed in the inside wall 44 of recess 43 in front of core base 41 (the upper left end as seen in FIG. 7) which has a flat bottom 41a. See FIG. 7 and FIG. 9. Note that a shoulder 40b rising a specific distance from core bottom 40a is formed in the front part of core bottom 40a.

A vertical end wall 49 for closing the rear end of rail core 20 supported on rail holder 42 is formed at the rear end of rear support bracket core 40.

Center support bracket core 50 is described next with reference to FIG. 10 to FIG. 14. Center support bracket core 50 has a construction very similar to front support bracket core 30. Core base 51, which has a flat bottom 51a, protrudes a specific height from core bottom 50a at approximately the longitudinal center of center support bracket core 50. Shoulders 50b rising a specific amount from core bottom 50a are formed at the front and back of core bottom 50a. The front and back ends of rail holder 52 are also both open similarly to front support bracket core 30. Furthermore, a pilot hole 55 is also formed in inside wall 54 of recess 53 in front and back of the core base 51.

Figure 13:
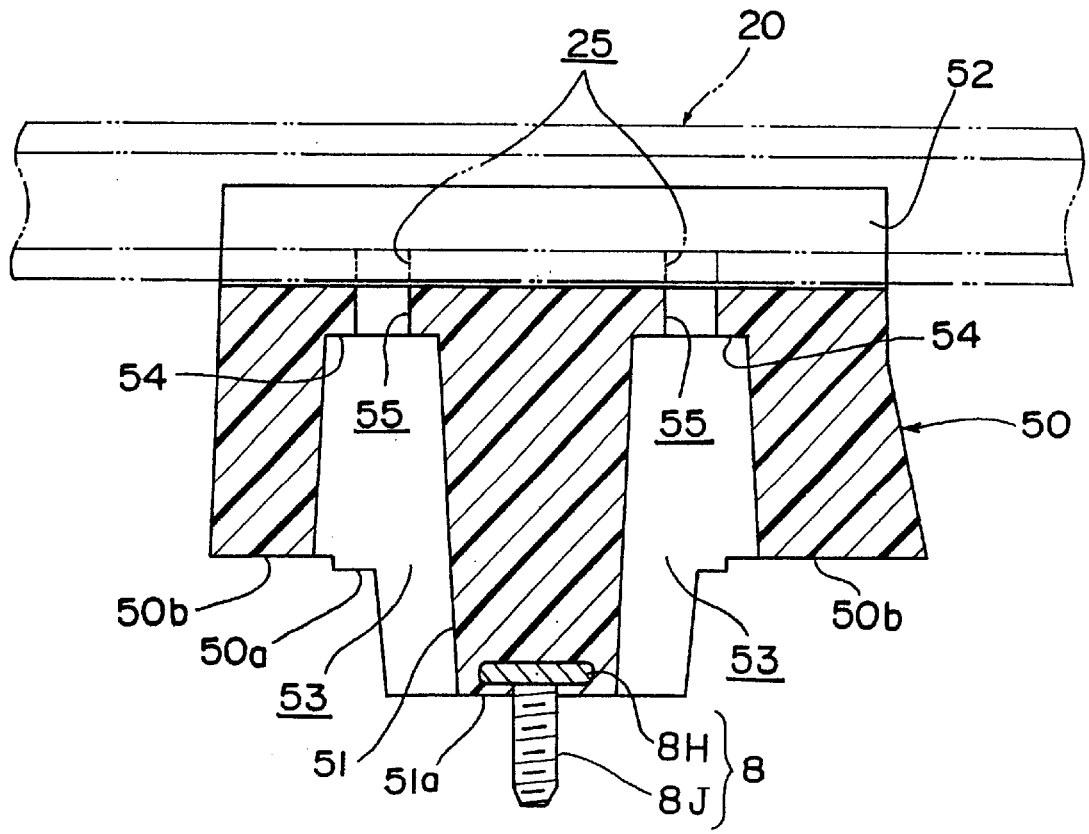
FIG. 13 is a vertical section through Y13—Y13 in FIG. 10.
Figure 14:
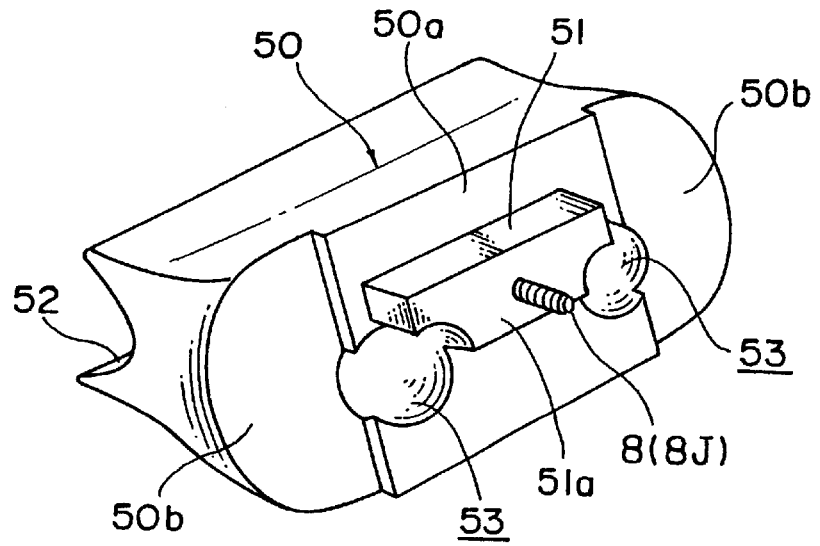
FIG. 14 is an oblique view of the bottom of the center support bracket core from the direction of arrow Y14 in FIG. 10.

The recesses 33, 43, and 53 formed in front, rear, and center support bracket cores 30, 40, and 50 are further described below using center support bracket core 50 by way of example. As shown in FIG. 13 and FIG. 14, recess 53 is formed to a specific depth whereby the thickness of inside wall 54 of recess 53 is thick appropriate for tightening self-tapping screw 15. The specific depth of these recesses 33, 43, 53 is preferably defined from the bottom 31a, 41a, 51a of the corresponding core base 31, 41, 51 as references (reference planes).

It will thus be obvious that because holes 35, 45, 55 (pilot holes). appropriate for self-tapping screw 15 whereby the support bracket cores 30, 40, 50 are fastened to rail core 20 are formed through inside wall 34, 44, 54 of recess 33, 43, 53 formed in the support bracket core 30, 40, 50, self-tapping screw 15 can be inserted from the recess 33, 43, 53 and easily tightened.

Support bracket cores 30, 40, 50 thus comprised are then fastened integrally to rail core 20 using self-tapping screws 15 to complete core assembly 10. The mechanism for mounting support bracket cores 30, 40, 50 to rail core 20 are thus pilot hole 35, 45, 55, and by fastening support bracket cores 30, 40, 50 to rail core 20 using self-tapping screws 15, support bracket cores 30, 40, 50 can be easily and reliably attached to rail core 20.

Insert molding is then used to cover the outside of core assembly 10, which is assembled by fastening support bracket cores 30, 40, 50 to rail core 20 as described above, with a synthetic resin skin. The result is an integral molding of the resin coating and the insert member, that is, core assembly 10. The material used for this resin coating is the same resin material used to mold the support bracket cores 30, 40, 50.

More specifically, the core assembly 10 is inserted to a specific position in the mold and the mold is then closed. Molten resin is then injected, for example, to fill the mold cavity in which the core assembly 10 is held. Insert molding processes are known in the literature, and further details about this insert molding process are therefore omitted below.

In this preferred embodiment of the invention support bracket cores 30, 40, 50 are used as the insert member for holding the core assembly 10 in the molding die. A so-called insert is therefore used in the molding die at positions corresponding to the supports 3, 4, 5.

The structure of the mold (metal die) used for insert molding of roof rack 1 is described next below using the mold parts for making the center support 5 by way of example. It should be noted that the mold parts for the front support 3 and rear support 4 are basically the same as those for the center support 5, and further detailed description thereof is omitted below.

Figure 15:
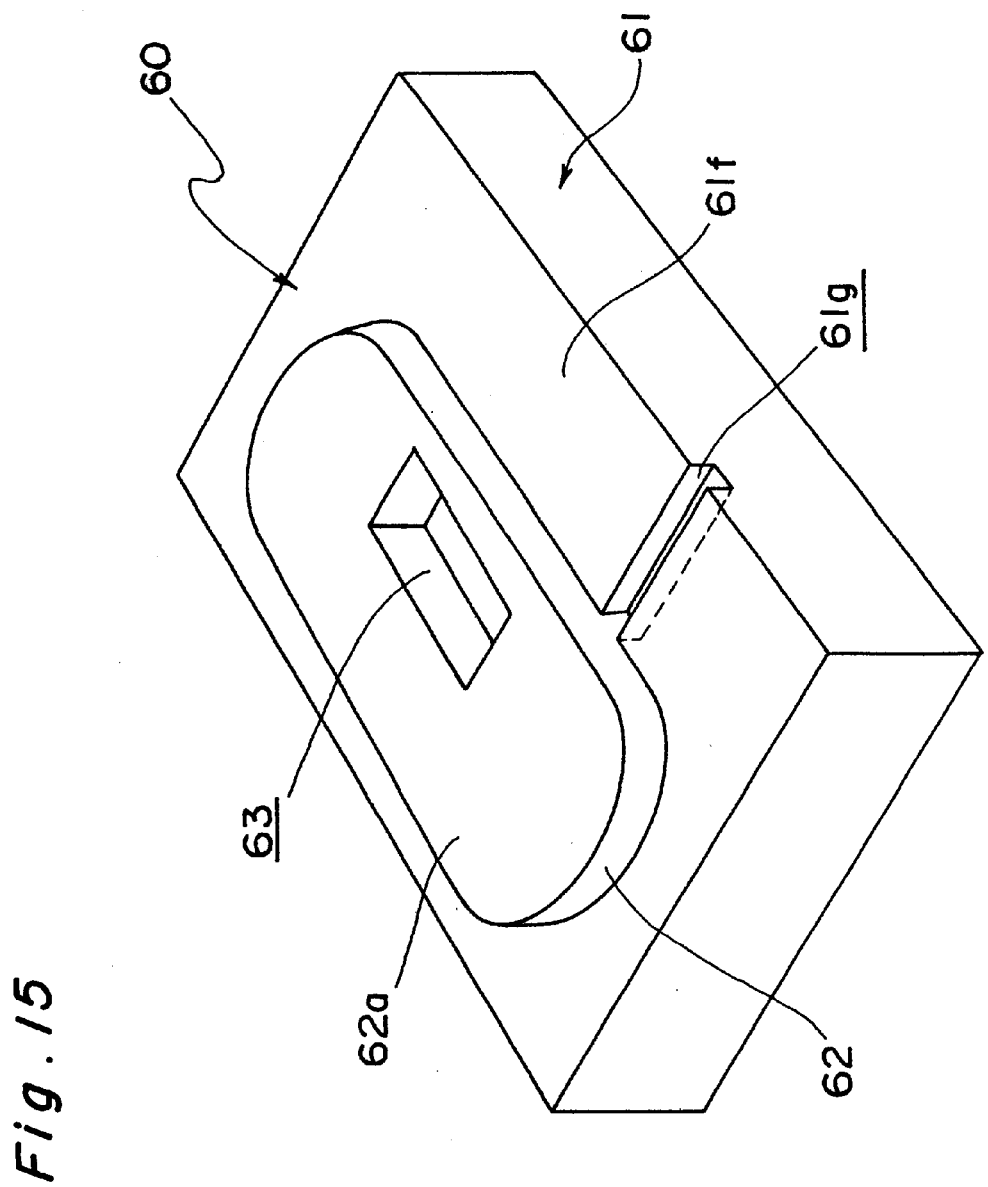
FIG. 15 is an oblique view of the insert for the center support bracket core used in insert molding of the roof rack.
Figure 16:
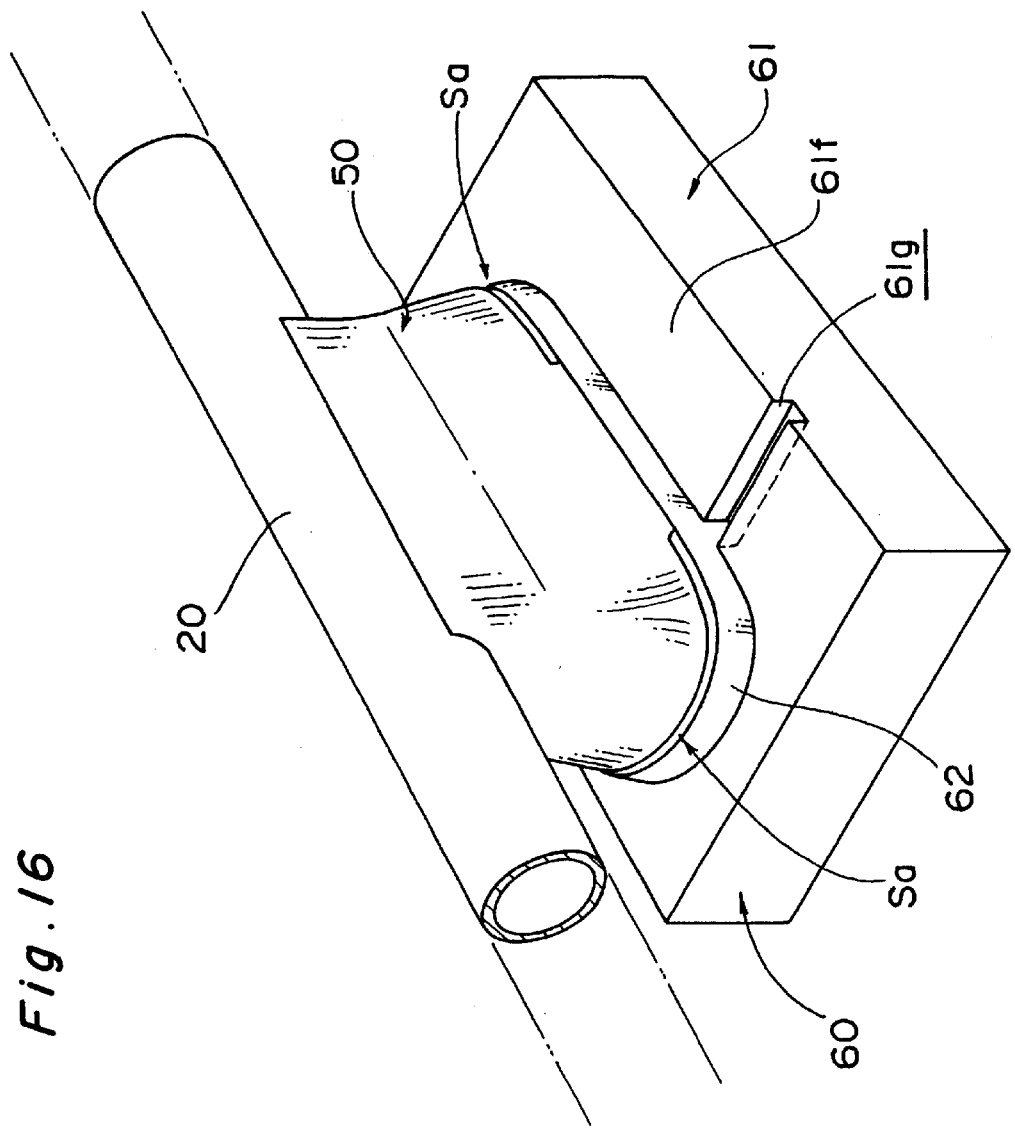
FIG. 16 is an oblique view of the insert in FIG. 15 assembled with the center support bracket core.

FIG. 15 is an oblique view of the insert 60 appropriate for the mold part corresponding to center support 5. FIG. 16 is an oblique view showing center support bracket core 50 secured in this insert 60. As will be known from these figures, insert 60 comprises a basically rectangular base 61, core holder 62 protruding a specific distance above top 61f of base 61 for holding center support bracket core 50, and recess 63 (first recess) disposed at an appropriate position in core holder 62 for holding core base 51 of center support bracket core 50. A channel 61g is further disposed at an appropriate place in top 61f extending from the edge of base 61 to core holder 62. As further described below, this channel 61g is part of the path (runner) for molten resin when insert 60 is assembled in the mold.

Figure 17:
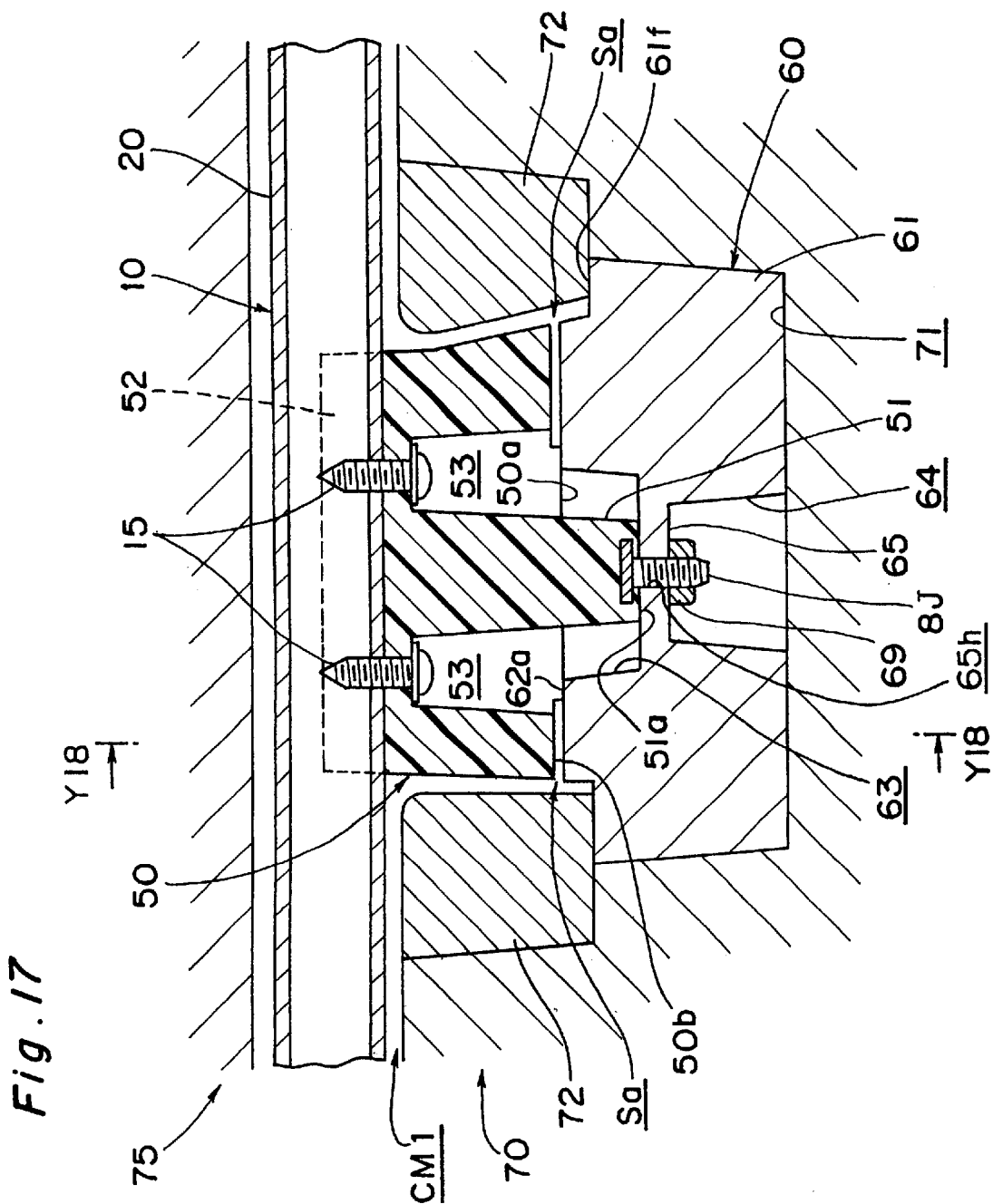
FIG. 17 is a vertical section view of a molding die for insert molding the roof rack when the center support bracket core is fastened thereto.

As shown in FIG. 17, a second recess 64 is formed in the side opposite first recess 63 with a wall 65 of a specific thickness therebetween. A through-hole 65h through which is passed the threaded shaft 8J of the bolt protruding from core base 51 is formed in wall 65.

The bottom of center support bracket core 50 is then fit into the top of insert 60 so that core base 51 is held in first recess 63 with the flat bottom 51a of core base 51 contacting the bottom of first recess 63.

A nut 69 is then threaded onto threads 8J of the bolt passing through through-hole 65h and protruding into second recess 64, and tightened. The center support bracket core 50 and insert 60 are thus fastened securely together with the flat bottom 51a of core base 51 tight to the bottom of first recess 63.

It is thus possible to assemble center support bracket core 50 to insert 60 using the mounting bolt 8 for securing the center support 5 (that is, center support bracket core 50) of roof rack 1 to vehicle roof Rm. Once insert molding is completed, insert 60 can be removed from center support bracket core 50 by simply removing nut 69.

The distance from bottom 51a of core base 51 is set so that core bottom 50a of center support bracket core 50 substantially touches (though there is actually a slight gap) surface 62a of core holder 62. More specifically, this distance is controlled to assure tight contact between bottom 51a of core base 51 and the bottom of first recess 63 so that core base 51 is held reliably and stable against wall 65 of insert 60.

A gap Sa is formed throughout the area between center support bracket core 50 and surfaces 50b and 62a, however, because shoulder 50b of center support bracket core 50 is offset a specific distance from core bottom 50a and is therefore separated by the same distance from surface 62a.

Inserts (not shown in the figures) are similarly connected to the front support bracket core 30 and rear support bracket core 40 to complete assembly of all inserts to the core assembly 10.

Figure 18:
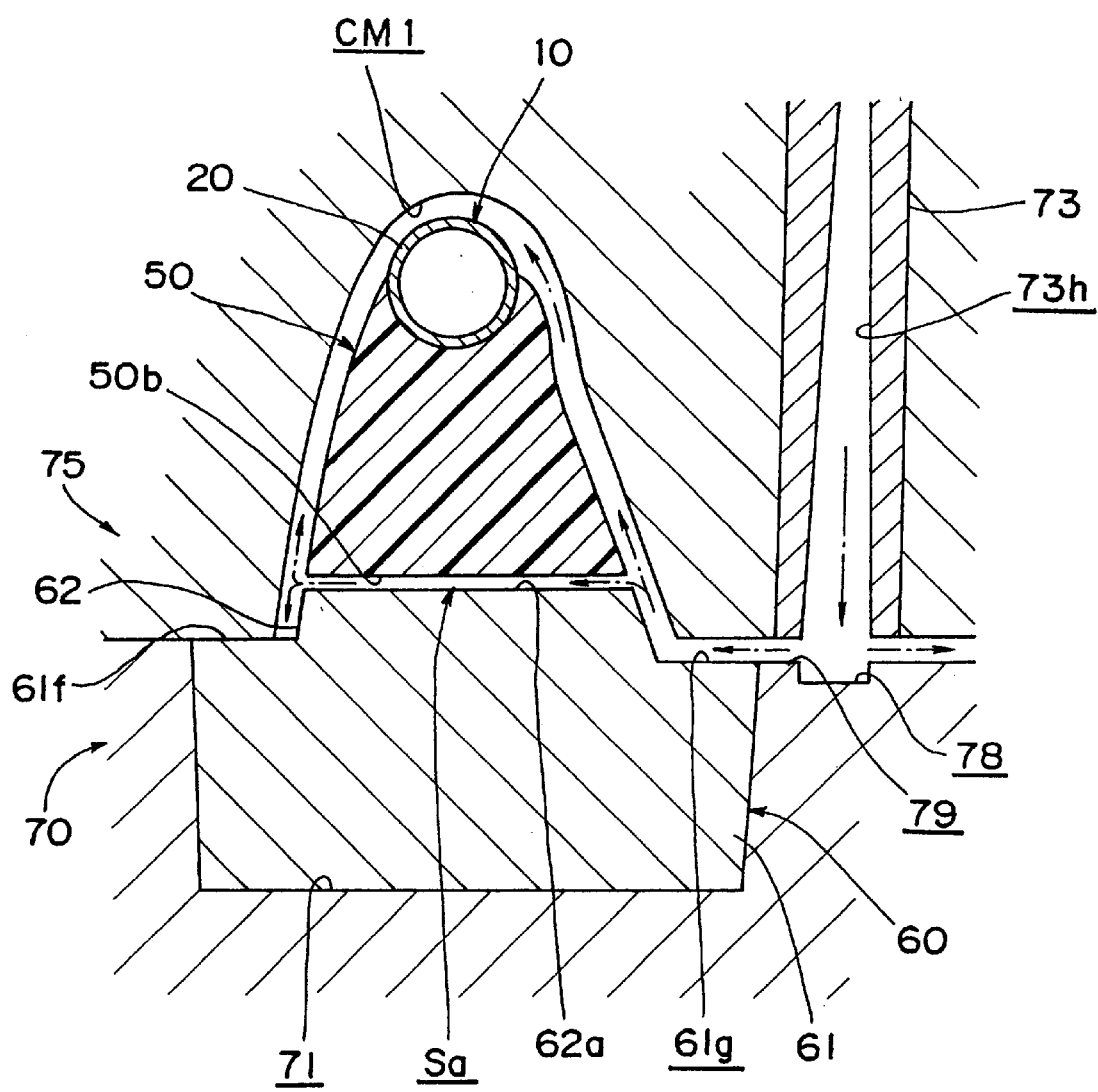
FIG. 18 is a partial vertical section view of the molding die through Y18—Y18 in FIG. 17.

When inserting core assembly 10 into a mold comprising a pair of dies 70 and 75 (see FIG. 17 and FIG. 18), the inserts 60 are all secured to one of the two dies. In FIG. 17 and FIG. 18 they are shown placed in die 70. More specifically, the base 61 of insert 60 holding center support bracket core 50 is fit into an insert recess 71 provided at a specific location in die 70 to fasten insert 60 in die 70.

A seating ring 72 is then fit into die 70 from above insert 60 so that its bottom pushes down on the top 61f of base 61 to firmly seat insert 60 into die 70. The other die 75 is then closed and clamped to 70, thus forming mold cavity CM1 between the surface of core assembly 10 and the surfaces of insert 60, die 70, seating ring 72, and die 75.

Similar operations are completed with the inserts (not shown in the figures) for the front and rear supports to prepare the complete core assembly 10 for insert molding. Molten resin is the injected to fill the resulting mold cavity CM1, coat the outside of core assembly 10 with synthetic resin, and thus obtain roof rack 1.

In inserting the core assembly 10 to the molding die, deflection and deformation of rail core 20 when inserting and securing the rail core 20 in the molding die can be reliably avoided because the inserts fastened to the support bracket cores 30, 40, 50 are fit into die 70, and the insertion force does not act directly on the long rail core 20.

A molding die 70, 75 according to this preferred embodiment of the invention is a two-shot or multipart mold that can simultaneously produce a pair of roof racks 1 from a single mold 70, 75. In addition, only one gate (single point gate) for supplying resin to both mold sections is provided between the tandem roof rack mold sections placed side by side, and molten resin can be supplied simultaneously to both roof rack mold sections from this single gate.

More specifically, as will be known from FIG. 18, a gate 78 (single point gate) is provided at the side of insert recess 71 for center support bracket core 50 in die 70. Resin supply path 73h formed in bushing 73 assembled to die 75 is open to gate 78. This bushing 73 is connected to a sprue bushing (not shown in the figure) connected to the injection nozzle (not shown in the figure) of the injection molding machine. Molten resin injected from the injection nozzle then passes the sprue of the sprue bushing through resin supply path 73h of bushing 73, and is then supplied from gate 78 to runners 79 to fill the mold cavities CM1 of the right and left mold sections.

A channel 61g is formed in base 61 of insert 60 from the edge of base 61 to core holder 62. This channel 61g is connected to runner 79, and runner 79 and channel 61g together form the runner for molten, resin from gate 78 to mold cavity CM1.

When viewed in a vertical section through the direction perpendicular to the longitudinal axis of rail core 20 as shown in FIG. 18, mold cavity CM1 is formed between the outside of center support bracket core 50 and the mold surface of die 75 in the area corresponding to center support bracket core 50 such that it forms a mound rising from the right and left sides over the top of rail core 20 at the peak. As previously noted, it is difficult with the conventional molding technique to assure that the molten resin completely fills the cavity because the molten resin supplied from the runner 79, 61g must travel through this mounded path from gate 78 to the far end of the mold cavity CM1, seen as the left end in the vertical section shown in FIG. 18.

The invention solves this problem as follows. That is, as noted above and shown in FIG. 18, shoulder 50b of support bracket core 50 is vertically offset a specific distance from core bottom 50a, and is thereby separated the same distance from surface 62a of insert core holder 62. As a result, space Sa is formed across the complete width of center support bracket core 50 between surfaces 50b and 62a (that is, in part of the contact area between support bracket core 50 and insert 60).

This space Sa connects the near and far ends of the mold cavity CM1 from gate 78. In other words, this space Sa forms a resin path connecting the ends of mold cavity CM1 that are nearest and farthest from resin supply runner 79, 61g.

Referring again to the vertical section view perpendicular to the longitudinal axis of rail core 20 and the dot-dash line shown in FIG. 18, this space Sa further enables the molten resin supplied flow from gate 78 and supply runner 79, 61g to flow both to the mold cavity CM1 formed between support bracket core 50 and die 75 as noted above, and through space Sa to the end part of mold cavity CM1 farthest from gate 78 (the left side as seen in FIG. 18). It is therefore possible using a resin supply gate 78 on only one side of rail core 20 to easily and reliably supply molten resin to the end part of the mold cavity farthest from gate 78.

In other words, it is possible to reliably and sufficiently supply molten resin to the end part of mold cavity CM1 farthest from the gate 78, and thereby assure a uniform resin fill, even when a pair of roof racks 1 is formed in a two-shot or multipart mold using only a single common resin supply gate to supply resin simultaneously to both halves of two parallel roof rack molds.

It is therefore not necessary to provide the mold with plural gates. The hot runner can also be relatively simply shaped. Molding die structure is thus simplified and the production cost thereof can thus be reduced.

Furthermore, space Sa formed between shoulders 50b of support bracket core 50 and core holder surface 62a of insert 60 communicates with recess 53 inside support bracket core 50. That is, recess 53 is connected to supply runner 79, 61g by intervening space Sa. As a result, after fastening center support bracket core 50 and rail core 20 together with self-tapping screw 15, resin can also be supplied to recess 53 when filling the mold cavity CM1 of the molding die 70, 75 with the coating resin (molten resin).

The resin coating thus formed over the head of self-tapping screw 15 prevents self-tapping screw 15 from corroding during extended use, and also helps prevent the screw from loosening due to vehicle vibrations.

Figure 19:
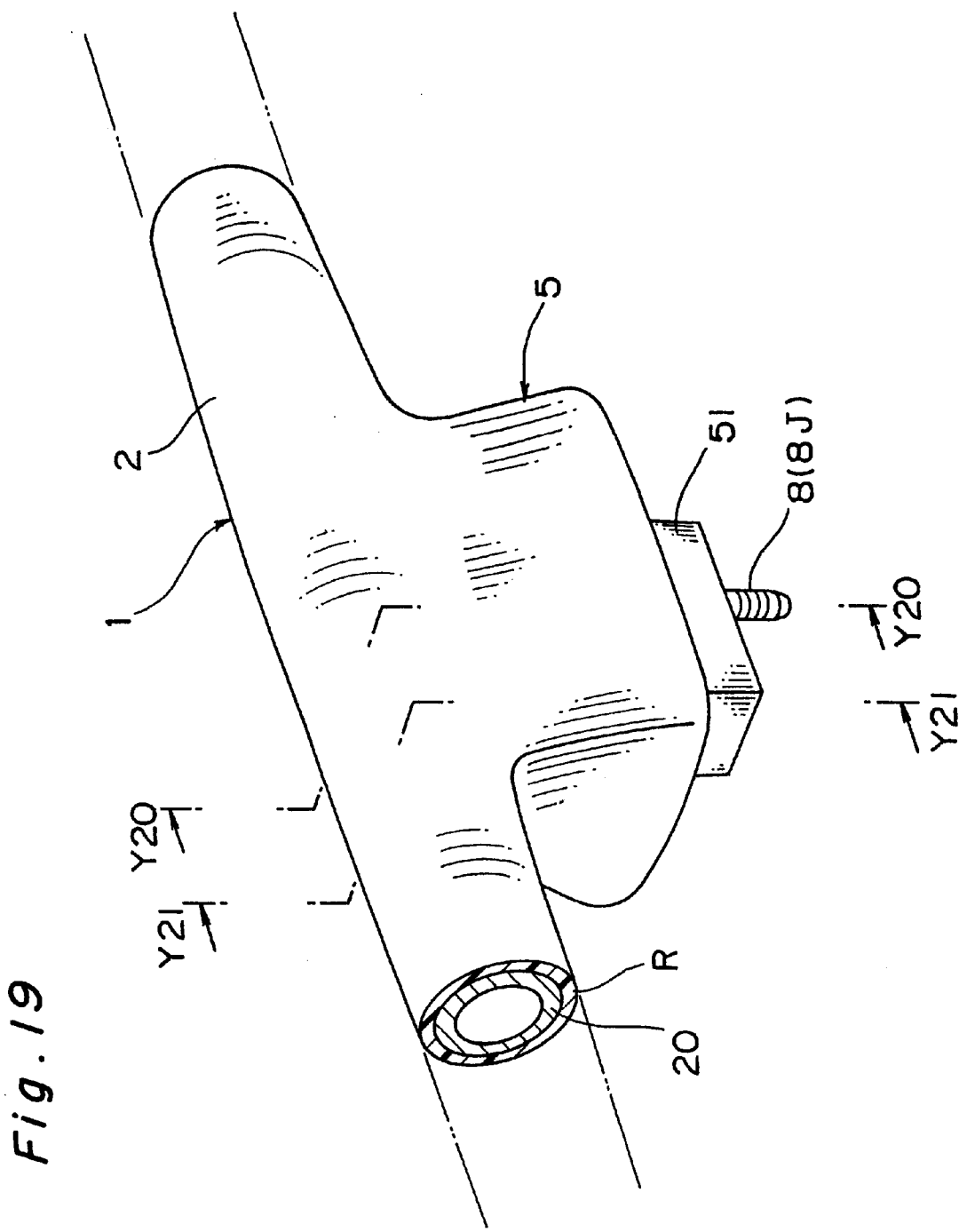
FIG. 19 is an oblique view of the insert molded center support of the roof rack and the adjacent area.
Figure 20:
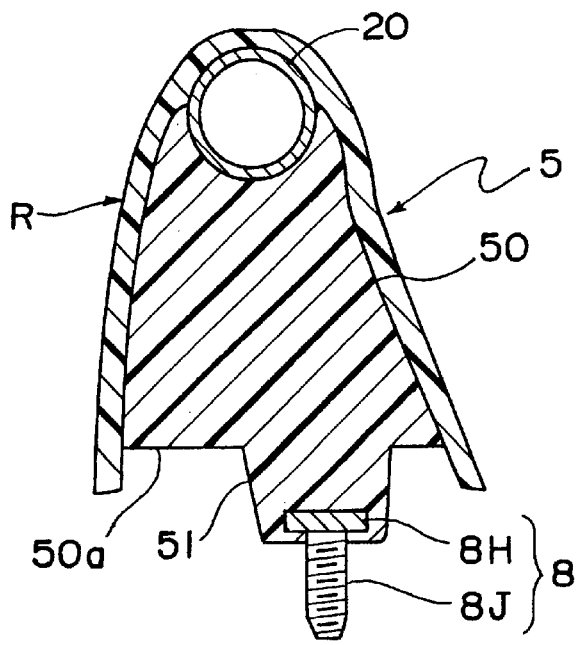
FIG. 20 is vertical section view of the roof rack center support and adjacent area through Y20—Y20 in FIG. 19.

The structure of roof rack center support 5 and the adjacent area formed by insert molding as described above is further explained below with reference to FIG. 19 to FIG. 21. As will be known from these figures, a uniform resin coating is formed in all parts of the roof rack 1 coating, including that part corresponding to the end part of mold cavity CM1 farthest from gate 78 (also seen on the left side in FIGS. 20 and 21). The shoulders 50b of support bracket core 50 are also covered by the resin layer formed by the resin supplied to space Sa between shoulders 50b and core holder surface 62a of insert 60 (see FIG. 21).

Figure 21:
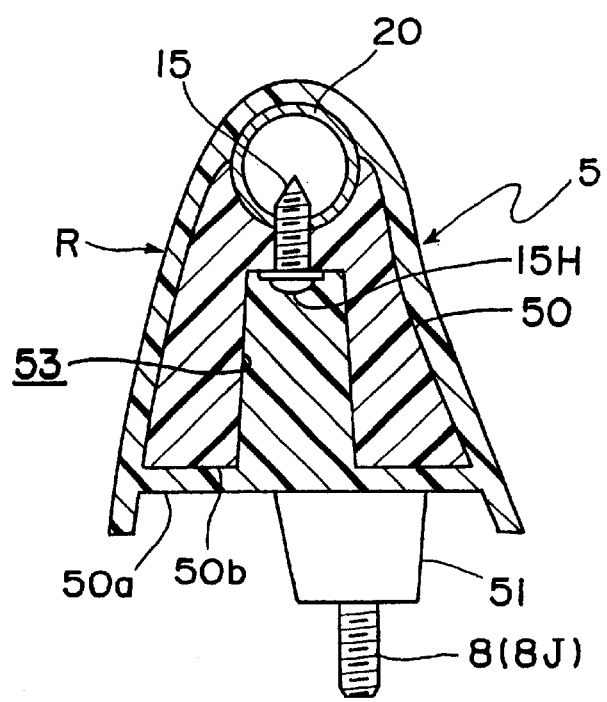
FIG. 21 is vertical section view of the roof rack center support and adjacent area through Y21—Y21 in FIG. 19.

Yet further, the head 15H of self-tapping screw 15 is covered by the resin filling recess 53 of center support bracket core 50 (see FIG. 21).

It will be obvious from the above description of the invention that by manufacturing the support bracket cores 30, 40, 50 from synthetic resin, support bracket cores can be mass produced with uniform results using a molding process whereby the cavity of molding die is filled with molten resin. Furthermore, productivity is significantly improved and shape and dimensional precision control are also easier compared with the bending and shaping processes required for conventional support bracket cores made from shaped sheet metal.

Manufacturing the support bracket cores 30, 40, 50 is also not made particularly difficult by offsetting the point at which supports 3, 4, 5 are fastened to the vehicle roof Rm (that is, the position of mounting bolts 8 of support bracket cores 30, 40, 50) widthwise to the vehicle from directly below the axis of the rail 2 (that is, rail core 20). It is therefore also easier to address requirements in roof rack design.

Furthermore, integrally molding the mechanism (that is, through-holes 35, 45, 55) for fastening synthetic resin support bracket cores 30, 40, 50 to rail core 20, and the mechanism for fastening the roof rack 1 to the vehicle (mounting bolts 8) also greatly simplifies the construction of support bracket cores 30, 40, 50 and greatly improves manufacturing productivity.

Adhesion of the resin coating is also greatly improved compared with a conventional metal support. As a result, separation of the resin coating from the support core surface is more difficult even when the resin coating is thin, and appearance defects such as blistering of the resin coating can be suppressed.

As described above, center support 5 may be offset for design considerations from halfway between the front support 3 and rear support 4 towards, for example, the rear support 4, thus increasing the span between front support 3 and center support 5 and enabling pressure from the injected molten resin during insert molding to bend and offset the pipe-shaped rail core 20 from its normal position. The resin coating formed on this deflected part of the rail core 20 may therefore be uneven and thin in places. The increased adhesion noted above, however, reduces the occurrence of appearance defects such as blistering caused by a drop in adhesion with the metal core assembly 10 where the resin coating R has become thin.

A variation of the first embodiment described above with reference to FIG. 1 to FIG. 21 is described next below.

It should be noted that like parts of which the construction and function thereof are same as those of the first embodiment and the following variation are indicated by same reference numeral, and further description thereof is omitted below.

Figure 22:
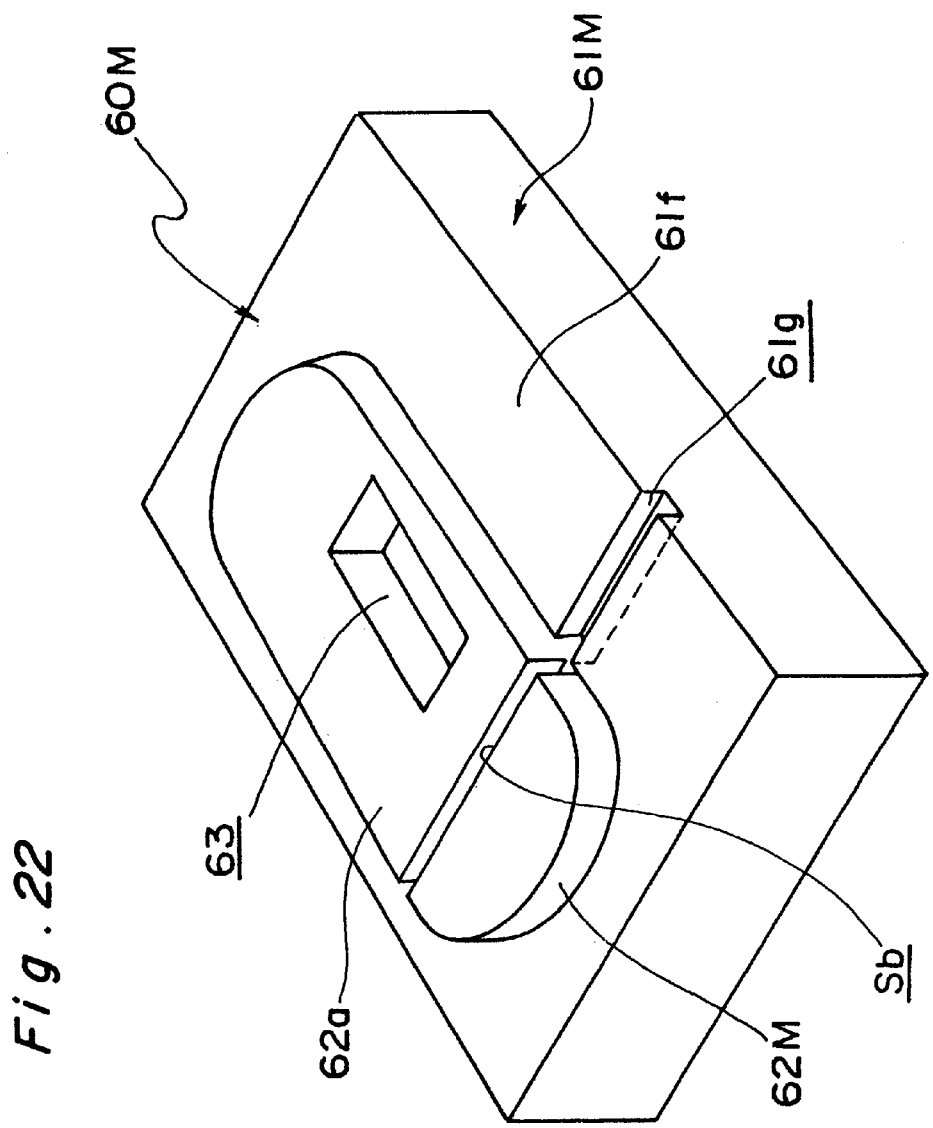
FIG. 22 is an oblique view of an insert for a center support bracket core according to an alternative version of the embodiment shown in FIG. 3.
Figure 23:
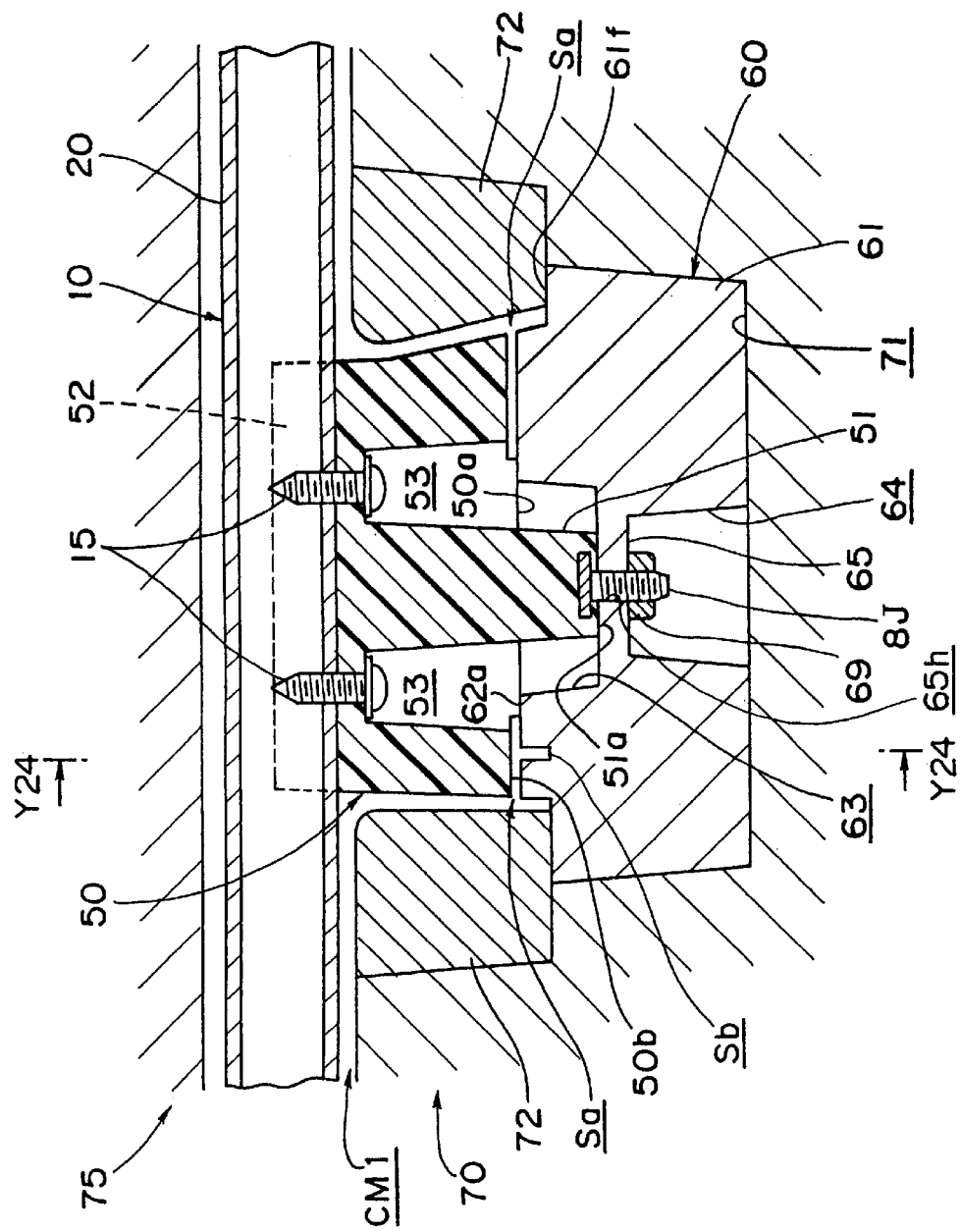
FIG. 23 is a partial vertical section view of the molding die when the insert according to this alternative version is combined with the center support bracket core in the mold.
Figure 24:
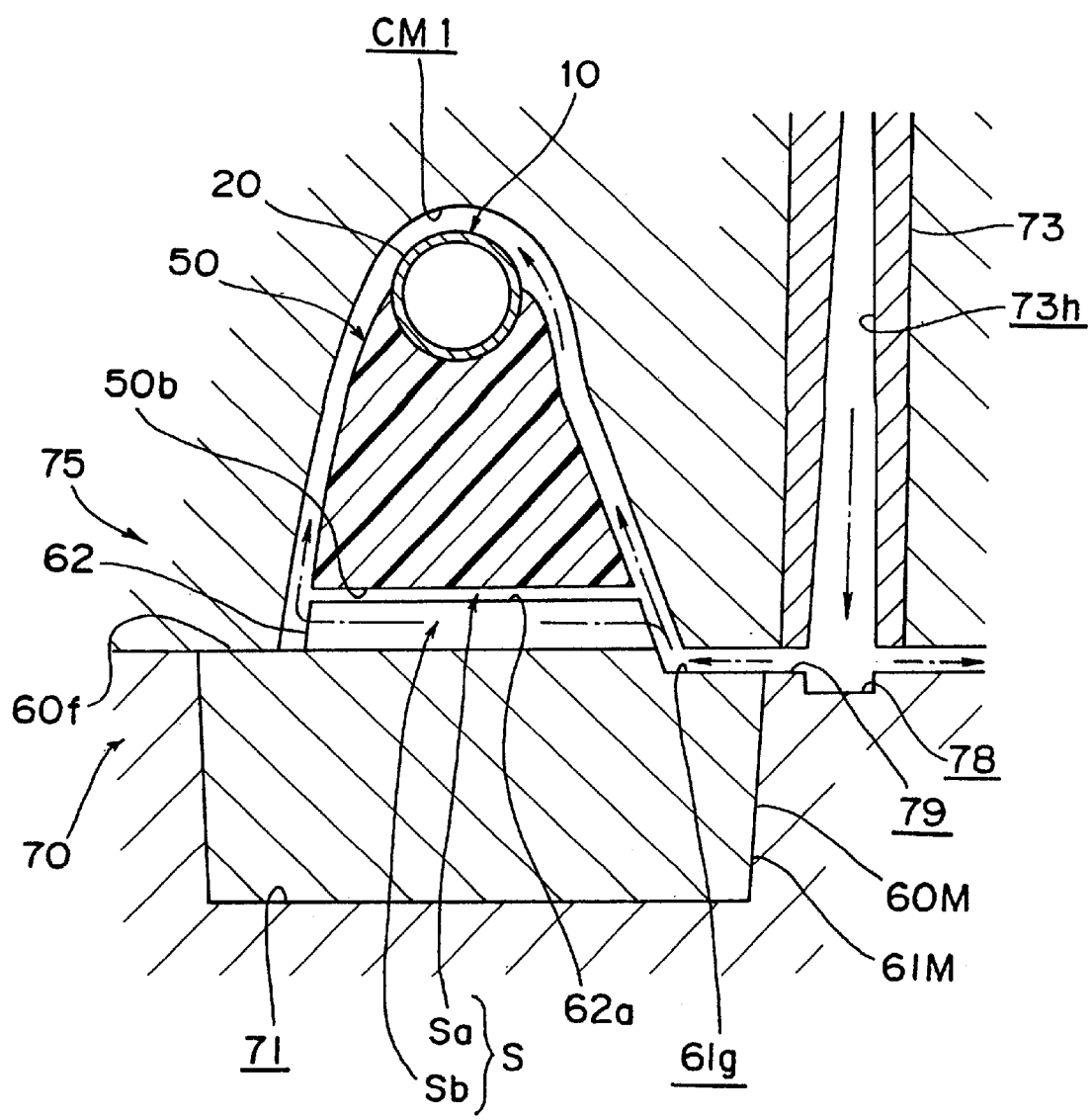
FIG. 24 is a vertical section view of the molding die through Y24—Y24 in FIG. 23.

As shown in FIG. 22 to FIG. 24, the cross sectional area of the space connecting the end parts of the mound-shaped mold cavity (when seen in vertical section perpendicular to the longitudinal axis of rail core 20) nearest and farthest from the gate is greater in this variation than in the preceding first embodiment.

As shown in FIG. 22, a slot Sb opening to surface 62a is formed in core holder 62M of insert 60M continuing from channel 61g in base 61M. This slot Sb has a specific width and a specific depth, which is preferably equal to the height of core holder 62M), and extends widthwise completely across core holder 62M. Slot Sb is further formed such that when insert 60M is assembled to the support bracket core (such as center support bracket core 50) it is below space Sa, which it will be remembered is formed between shoulders 50b of center support bracket core 50 and surface 62a of the core holder 62M part of insert 60M (that is, in part of the contact area between support bracket core 50 and insert 60M).

By thus forming slot Sb, the end parts of mold cavity CM1, which it will also be remembered is hood-shaped when seen in vertical section perpendicular to the longitudinal axis of rail core 20 (see FIG. 24), nearest and farthest from gate 78 communicate with each other through an intervening resin path S, the cross sectional area or volume of which is the combination of the slot Sb and the space Sa formed between shoulders 50b of support bracket core 50 and surface 62a of insert core holder 62M.

After core assembly 10 is inserted and fixed in die 70 and die 75 is then closed, the coating resin (molten resin) is injected and supplied to mold cavity CM1 by way of supply runner 79, 61g from gate 78. As shown by the dot-dash line and arrows in the vertical section view perpendicular to the longitudinal axis of rail core 20 in FIG. 24, the molten resin flows from gate 78 and supply runner 79, 61g to flow both to the mold cavity CM1 formed between support bracket core 50 and die 75 as noted above, and through resin path S (that is, space Sa and slot Sb) to the end part of mold cavity CM1 farthest from gate 78 (the left side as seen in FIG. 24).

Because of the large cross sectional area of resin path S in this variation of the first embodiment, it is possible to even more easily (compared with the first embodiment) reliably supply molten resin to the end part of mold cavity CM1 farthest from the gate 78, and thereby assure a uniform resin fill, even when the resin supply gate 78 is provided on only one side of the rail core 20.

A further variation of the first embodiment is described next below with reference to FIG. 25 and FIG. 26. An object of this variation is to further reduce the weight of support bracket core.

Figure 25:
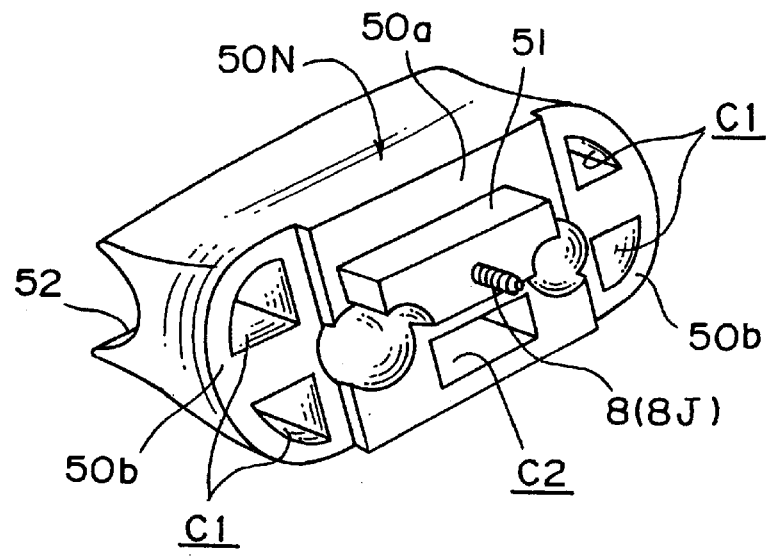
FIG. 25 is an oblique view from the bottom of a center support bracket core according to a further alternative version of the invention.
Figure 26:
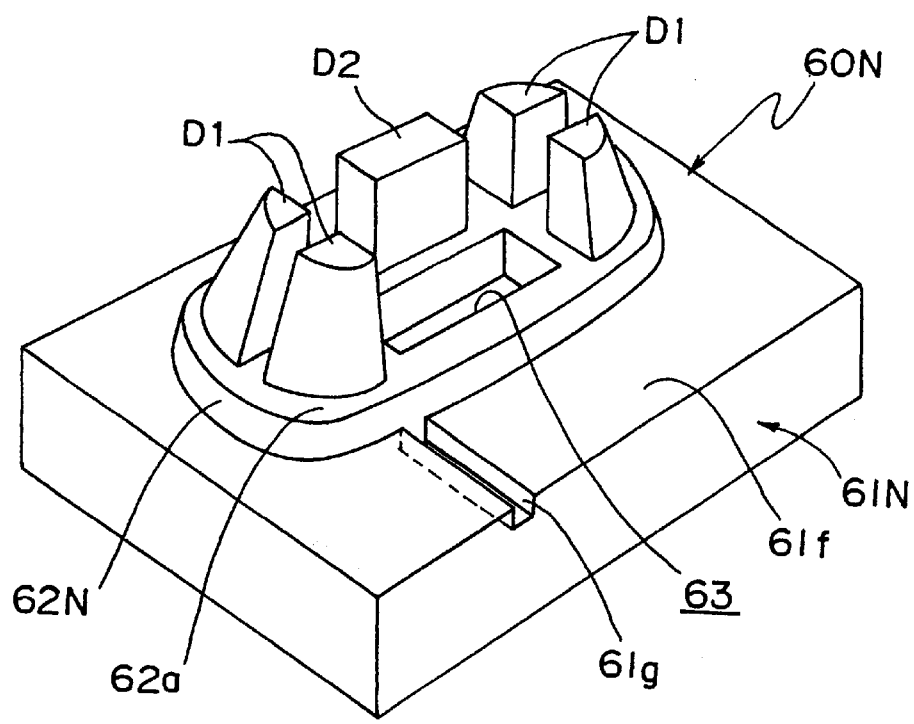
FIG. 26 is an oblique view of an insert for the center support bracket core shown in FIG. 25.
Figure 27:
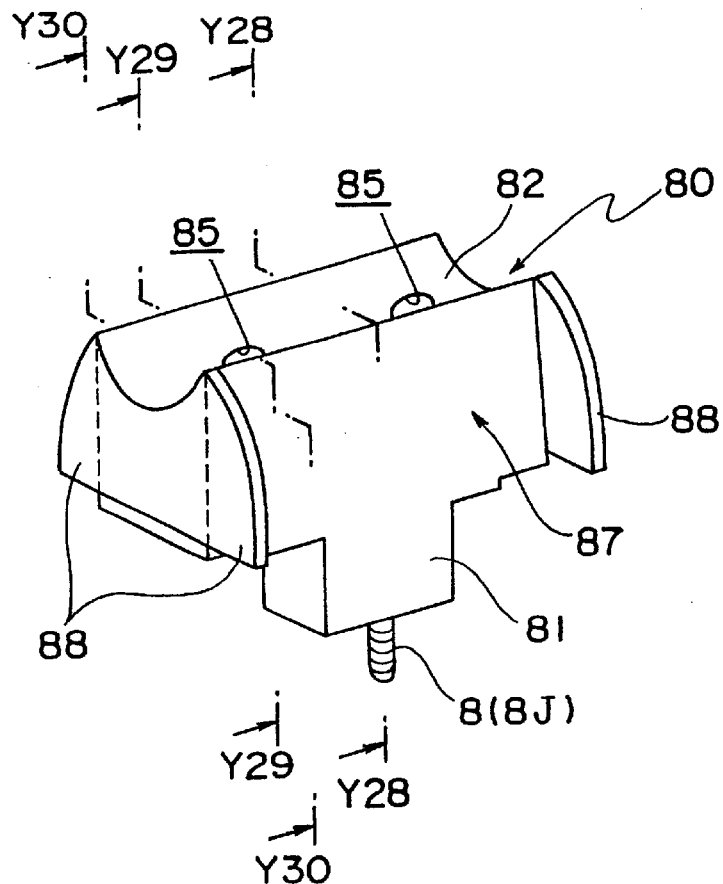
FIG. 27 is an oblique view of a center support bracket core according to a second preferred embodiment of the invention.
Figure 28:
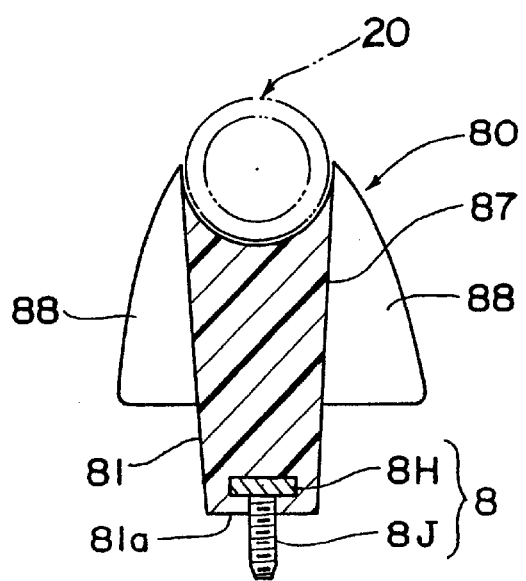
FIG. 28 is a vertical section view of the center support bracket core through Y28—Y28 in FIG. 27.
Figure 29:
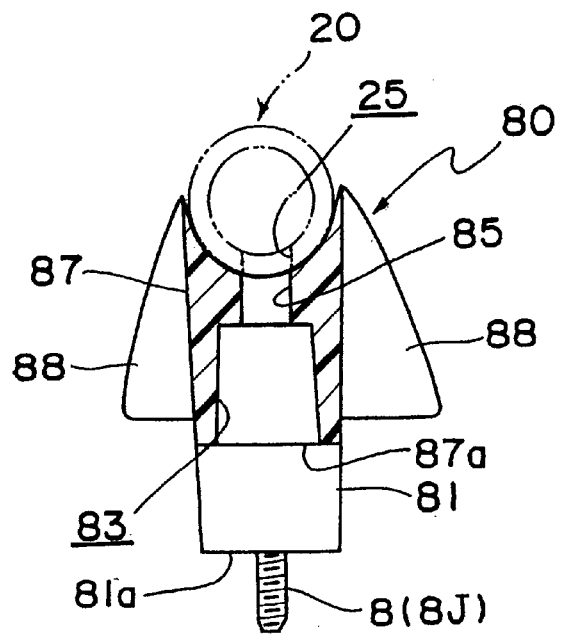
FIG. 29 is a vertical section view of the center support bracket core through Y29—Y29 in FIG. 27.
Figure 30:
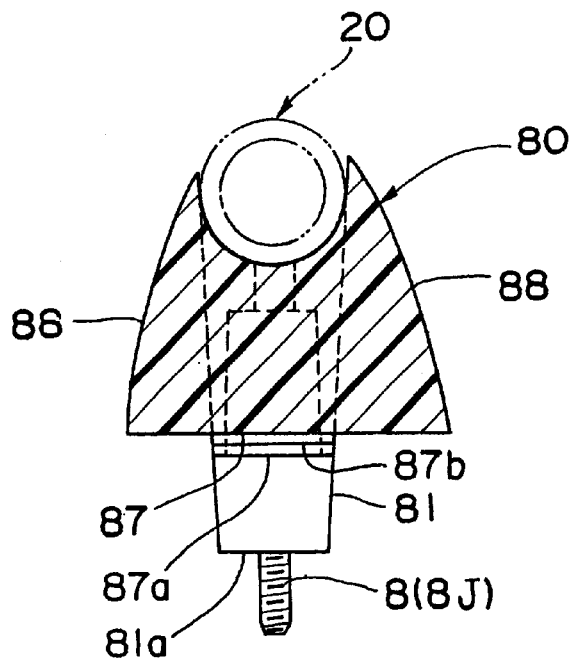
FIG. 30 is a vertical section view of the center support bracket core through Y30—Y30 in FIG. 27.
Figure 31:
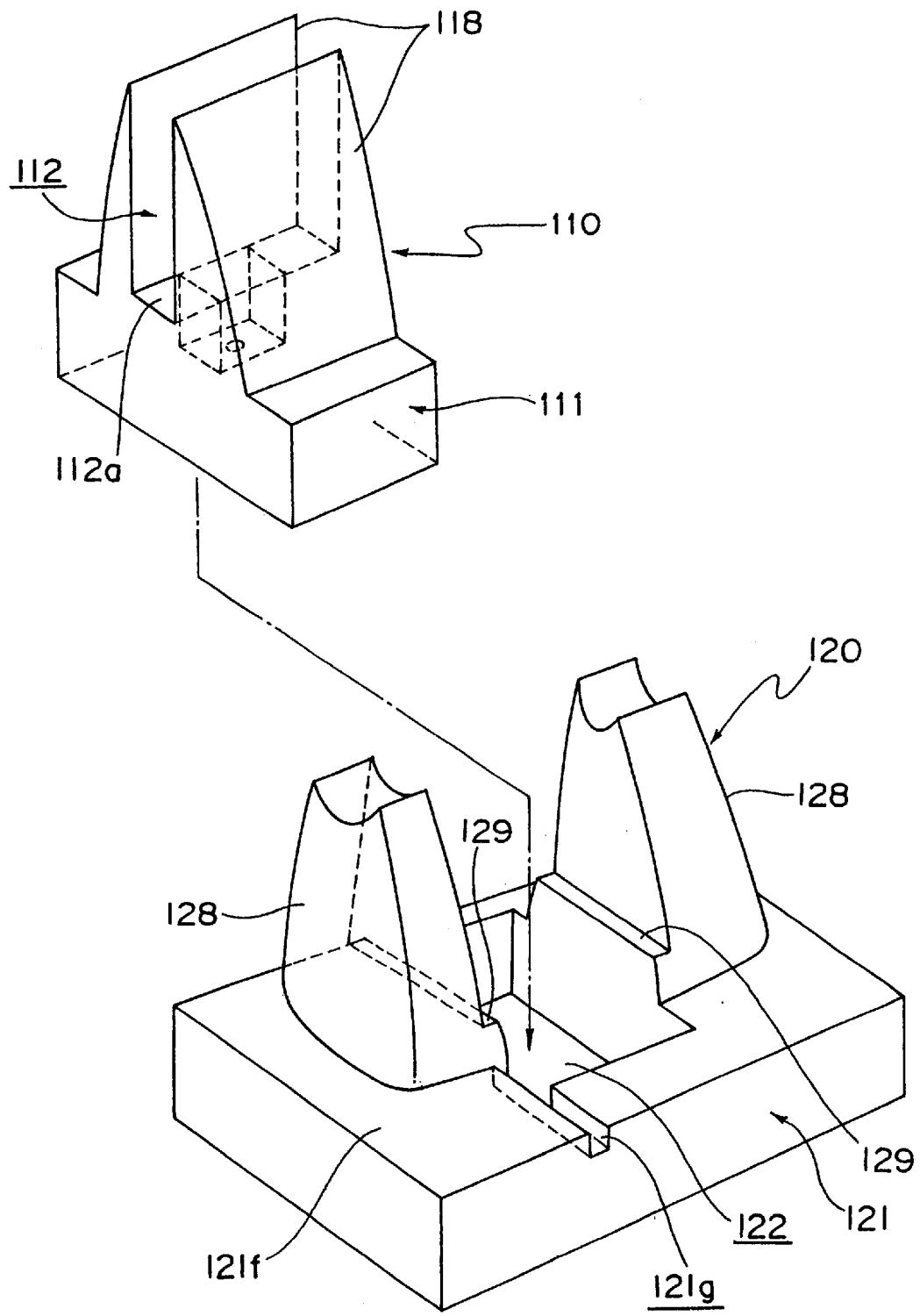
FIG. 31 is an oblique view of a combined insert for use with this second preferred embodiment of the invention.

FIG. 25 is an oblique view from the bottom of a support bracket core (such as center support bracket core 50N) according to this variation. FIG. 26 is an oblique view from above of the insert 60N used in conjunction with this support bracket core 50N. As will be known from FIGS. 25 and 26, a plurality of cavities C1 and C2 is formed in the bottom of a support bracket core 50N according to this variation of the first embodiment. More specifically, two cavities C1 are formed in each of the front and back shoulders 50b, and one cavity C2 is formed at a specific location in core bottom 50a. These cavities C1, C2 are preferably tapered on the inside.

It will be obvious that these cavities C1, C2 reduce the weight of support bracket core 50N.

Protrusions D1, D2 matching the shape and dimensions of the cavities C1, C2 are formed at corresponding positions on core holder 62N of insert base 61N. Further preferably, the outside profile of these protrusions D1, D2 matches the preferred tapered shape of the inside of cavities C1, C2 in support bracket core 50N.

When insert 60N is then assembled with support bracket core 50N, protrusions D1, D2 on insert 60N fit into corresponding cavities C1, C2 on support bracket core 50N with the matching tapered profiles assuring that the protrusions D1, D2 occlude matching cavities C1, C2.

When support bracket core 50N assembled with insert 60N is inserted to die 70 for insert molding, the coating resin will not flow into and fill the cavities C1, C2 of support bracket core 50N, thereby making it possible to reduce the weight of the roof rack.

Embodiment 2

A support bracket core according to a second preferred embodiment of the invention is described next below with reference to FIG. 27 to FIG. 30. It should be noted that while this second embodiment is described using the center support by way of example, it is basically the same for the front and rear supports.

As shown in the figures, center support bracket core 80 according to this embodiment of the invention has a body (support bracket core body) 87 of a specific width, a core base 81 protruding from the bottom of core body 87 and functioning as the mounting base for fastening the roof rack to vehicle roof Rm, and a rail holder 82 for holding and securing a pipe-shaped rail core 20. A plurality of through-holes 85, that is, two, one front and back in this embodiment, is provided in rail holder 82 as a mechanism for fastening center support bracket core 80 to rail core 20. Note that the sides of support bracket core body 87 are tapered to a specific angle.

Core base 81 protrudes a specific height from core bottom 87a at about the longitudinal center of center support bracket core 80. Shoulders 87b raised a specific amount from core bottom 87a are also formed longitudinally front and back of the core bottom 87a.

Mounting bolt 8 for mounting the roof rack to vehicle roof Rm is integrally fastened to core base 81 with head 8H thereof embedded in core base 81 and the shaft (threads) 8J protruding perpendicularly from flat bottom 81a. It should be noted that this mounting bolt 8 is equivalent to the mechanism of the accompanying claims for mounting the roof rack (support bracket core) to the vehicle.

In this preferred embodiment right and left side ribs 88 of a specific thickness project perpendicularly or substantially perpendicularly from core body 87 at the front and back edge parts of center support bracket core 80. These ribs 88 are integrally molded with core body 87 when molding the center support bracket core 80 (which is insert molded assembled with mounting bolt 8). It should be noted that the synthetic resin used to mold this center support bracket core 80 can be the same material used in the first embodiment.

A recess 83 of a specific depth from core bottom 87a is also formed in center support bracket core 80 in front and back of core base 81. A pilot hole 85 for tapping is formed in the inside wall 84 of recess 83. A self-tapping screw 15 is passed through through-hole 85 for fastening center support bracket core 80 to the pipe-shaped rail core 20.

Center support bracket core 80 is thus assembled with rail core 20 to complete core assembly 10. A combined insert such as shown in FIG. 31 to FIG. 34 is used to insert and hold core assembly 10 in the molding die 70.

This combined insert comprises a first insert 110 inserted to center support bracket core 80, and a second insert 120 for holding first insert 110. This second insert 120 is then inserted to die 70, thus holding core assembly 10 inserted to die 70.

The first insert 110 has a basically rectangular base 111, a pair of standing walls 118 rising from the top of base 111 and separated a specific distance, a channel 112 formed in the space between walls 118 for holding the core body, and a first recess 113 formed at an appropriate location in bottom 112a of channel 112 for holding core base 81 of center support bracket core 80.

A second recess 114 (see FIG. 33) is formed in the back of first recess 113 with a wall 115 of a specific thickness separating second recess 114 and first recess 113. A through-hole 115h is formed in wall 115, thus enabling threads 8J of mounting bolt 8 protruding from core base 81 to pass from first recess 113 into second recess 114.

The bottom side of core body 87 of center support bracket core 80 is inserted to channel 112 of first insert 110 until the flat bottom of core base 81 contacts the bottom of first recess 113 and core base 81 is thus held in first recess 113. The inside walls of channel 112 (that is, the inside surfaces of walls 118) are tapered to a slope matching the side surfaces of core body 87. Core body 87 is thus inserted to channel 112 with the tapered surfaces thereof matching.

A nut 119 is then threaded onto threads 8J protruding through through-hole 115h into second recess 114. The flat bottom of core base 81 is then held securely to the bottom of first recess 113, and center support bracket core 80 and first insert 110 are fastened together. When insert molding is completed, nut 119 is removed and first insert 110 is removed from center support bracket core 80.

The distance from bottom 81a of core base 81 is preferably set so that core bottom 80a of center support bracket core 80 substantially touches (though there is actually a slight gap) bottom 112*a* of core holder channel 112. More specifically, this distance is controlled to assure tight contact between bottom 81*a* of core base 81 and the bottom of first recess 113 so that core base 81 is held reliably and stable against wall 115 of insert 110.

A gap Sa is formed throughout the area between center support bracket core 80 and surfaces 80*b* and 112*a*, however, because shoulder 80*b* of center support bracket core 80 is offset a specific distance from core bottom 80*a* and is therefore separated by the same distance from bottom 112*a*.

Second insert 120 has a basically rectangular base 121, a pair of standing walls 128 rising from the surface of base 121 and separated a specific distance from each other, and an opening 122 formed between walls 128. The top of walls 128 supports the pipe-shaped rail core 20 of core assembly 10. The shape and dimensions of opening 122 are determined so that base 111 of first insert 110 fits therein.

A ledge 129 of a specific width is formed between opening 122 and each wall 128. The width of this ledge 129 is slightly greater than the width of center support bracket core ribs 88. The height of ledge 129 determined so that when base 111 of first insert 110 is fit and held inside opening 122, the surface of ledge 129 is substantially flush with bottom 112*a* of channel 112 in first insert 110.

First insert 110, which is fastened to core assembly 10, is then fit into second insert 120. That is, first insert base 111 is fit into opening 122 in second insert base 121.

Figure 32:
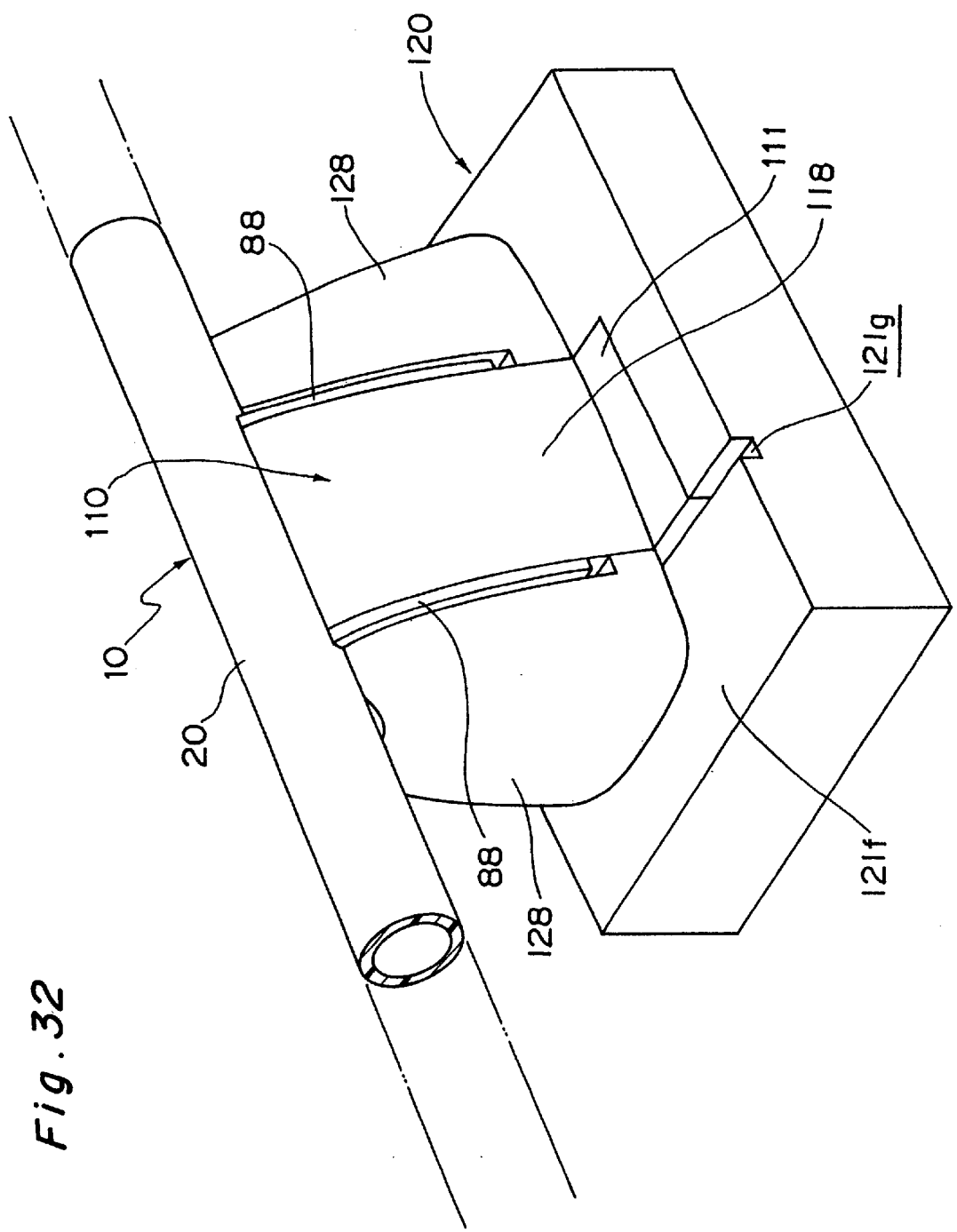
FIG. 32 is an oblique view of a combined insert assembled with the center support bracket core of the core assembly according to this second preferred embodiment of the invention.
Figure 33:
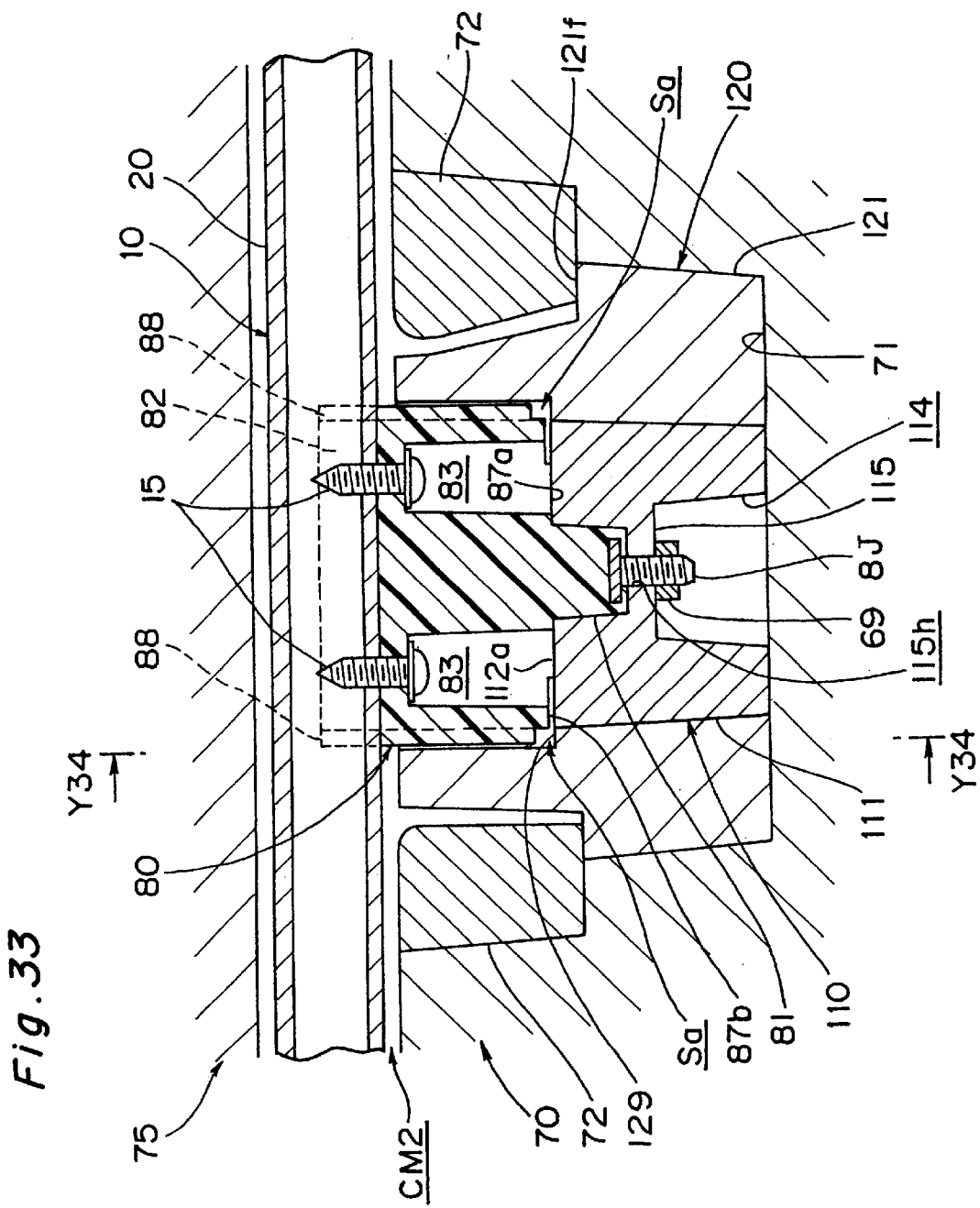
FIG. 33 is a partial vertical section view of the molding die in which is inserted the combined insert assembled with the center support bracket core of the core assembly according to this second preferred embodiment of the invention.

As will be known from FIG. 32, the outside profiles of walls 118 and 128 are set so that the outside of first insert walls 118, the outside of center support bracket core ribs 88, and the outside of second insert walls 128 are positioned on basically continuous curved plane.

It should be noted that the front and rear support bracket cores are similarly combined with correspondingly matching inserts (not shown in the figures) to fasten all inserts to core assembly 10.

The second inserts 120 are assembled to one metal die 70 to insert and secure core assembly 10 in the metal die 70 for insert molding of core assembly 10 using a pair of dies 70, 75. More specifically, base 121 of second insert 120 is fit into an insert recess 71 appropriately disposed in metal die 70 to secure the second insert 120 of the center support bracket core 80 in metal die 70.

A seating ring 72 is then fit into metal die 70 from above second insert 120 so that its bottom pushes down on the top 121f of base 121 to firmly seat second insert 120 into metal die 70. The other metal die 75 is then closed and clamped to the metal die 70, thus forming mold cavity CM2 between the surface of core assembly 10 and the surfaces of first and second inserts 110 and 120, die 70, seating ring 72, and die 75.

Similar operations are completed with the inserts (not shown in the figures) for the front and rear supports to prepare the complete core assembly 10 for insert molding. Molten resin is then injected to fill the resulting mold cavity CM2, coat the outside of core assembly 10 with synthetic resin, and thus obtain roof rack 101.

Deflection and deformation of rail core 20 when inserting and securing the core assembly 10 in the mold can be reliably avoided because the insert assemblies fastened to the support bracket cores are fit into die 70, and the insertion force does not act directly on the long rail core 20.

As in the first embodiment, mold 70, 75 is a two-shot or multipart mold having only one gate (single point gate) for supplying resin to both mold sections. As will be known from FIG. 34, a gate 78 (single point gate) is provided at the side of insert recess 71 for center support bracket core 80 in die 70. Runner 79 extends to both sides from gate 78, and communicates with channels 121*g* formed in base 121 of second insert 120. Runner 79 and channel 121*g* together form the runner for molten resin from gate 78 to mold cavity CM2.

Figure 34:
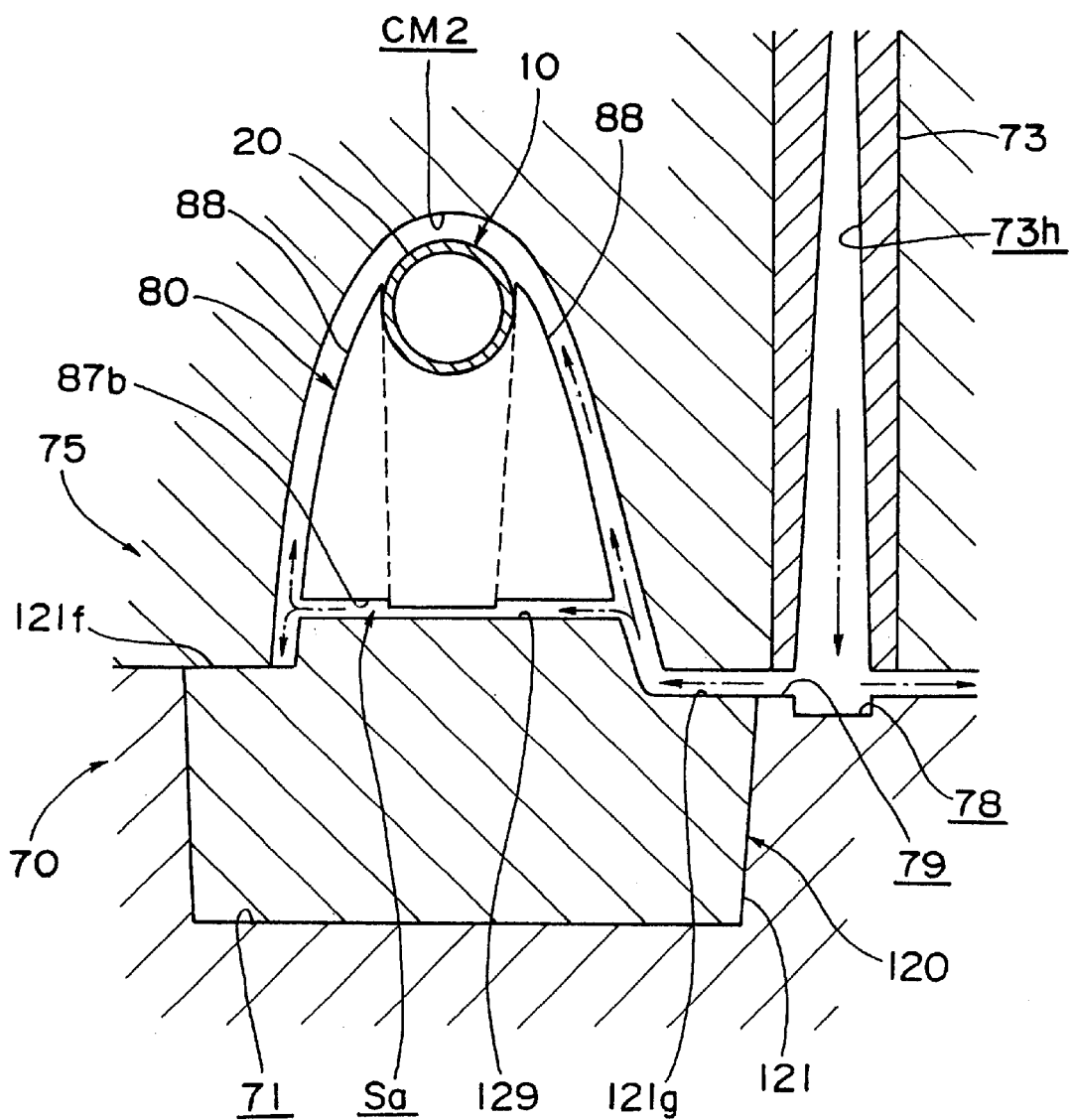
FIG. 34 is a vertical section view of the molding die through Y34—Y34 in FIG. 33.

When viewed in a vertical section through the direction perpendicular to the longitudinal axis of rail core 20 as shown in FIG. 34, resin supply runner 79, 121*g* is continuous to the mold cavity part at one of the ribs 88 of center support bracket core 80 in this embodiment of the invention. Further preferably, gate 78 is positioned to the side of center support bracket core rib 88, and resin supply runner 79, 121*g* is connected substantially in line with the mold cavity part corresponding to rib 88.

As will be known from the vertical section view through the direction perpendicular to the longitudinal axis of rail core 20 in FIG. 34, mold cavity CM2 is formed between the outside of ribs 88 and the molding surface of die 75 in the area corresponding to ribs 88 of center support bracket core 80 such that the mold cavity forms a mound rising from the right and left sides over the top of rail core 20 at the peak.

As noted above, shoulders 87*b* of core body 87 are vertically offset a specific distance from core bottom 87*a*, and are thereby separated the same distance from ledge 129 of second insert 120. As a result, space Sa is formed across the complete width of center support bracket core 80 between surfaces 87*b* and 129, that is, in part of the contact area between center support bracket core 80 and second insert 120.

This space Sa connects the near and far ends of the mold cavity CM2 from gate 78. In other words, this space Sa forms a resin path connecting the ends of mold cavity CM2 that are nearest and farthest from resin supply runner 79, 121*g*.

Referring again to the vertical section view perpendicular to the longitudinal axis of rail core 20 and the dot-dash line shown in FIG. 34, this space Sa further enables the molten resin supplied flow from gate 78 and supply runner 79, 121*g* to flow both to the mold cavity CM2 formed between ribs 88 and die 75 as noted above, and through space Sa to the end part of mold cavity CM2 farthest from gate 78 (the left side as seen in FIG. 34). It is therefore possible using a resin supply gate 78 on only one side of rail core 20 to easily and reliably supply molten resin to the end part of the mold cavity farthest from gate 78.

In other words, as same in the first embodiment, it is possible to reliably and sufficiently supply molten resin to the end part of mold cavity CM2 farthest from the gate 78, and thereby assure a uniform resin fill as in the first embodiment described above, even when a pair of roof racks 101 is formed in a two-shot or multipart mold using only a single common resin supply gate to supply resin simultaneously to both halves of two parallel roof rack molds.

It is therefore not necessary to provide the mold with plural gates. The hot runner can also be relatively simply shaped. The structure of molding die is thus simplified and production cost thereof can thus be reduced.

Furthermore, space Sa communicates with recess 83 inside center support bracket core 80 because 87*b* of core body 87 is similarly separated from bottom 112*a* of channel 112 in first insert 110, bottom 112*a* being flush or substantially flush with second insert ledge 129.

That is, a resin supply path is formed to recess 83 from resin supply runner 79, 121*g* through space Sa. As in the first embodiment, after center support bracket core 80 and rail core 20 are connected to each other using self-tapping screws 15, and the coating resin (molten resin) is supplied to and fills the mold cavity CM2 of molding die 70, 75, recess 83 can also be filled with resin, and the benefits achieved in the first embodiment can therefore also be achieved in this second embodiment.

Figure 38:
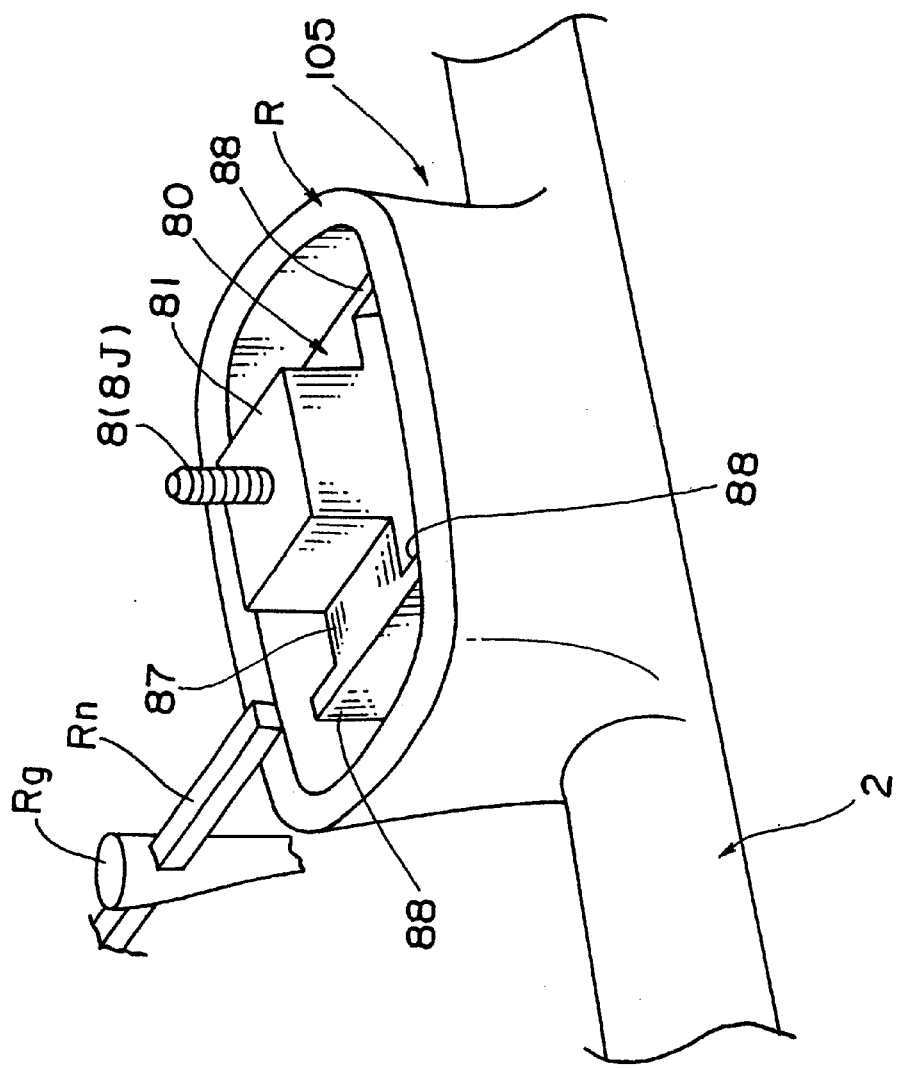
FIG. 38 is an oblique view from the bottom of a roof rack center support bracket and adjacent area according to this second embodiment of the invention.

FIG. 38 is an oblique view from the bottom of center support 105 of insert molded roof rack 101 and the surrounding area before removal of waste portion Rg at gate 78 and waste portion Rr at resin supply runner 79, 121g.

As will be known from these figures, gate 78 is positioned to the side of ribs 88 of center support bracket core 80, and resin supply runner 79, 121g communicates with the molding cavity part corresponding to ribs 88, preferably directly and even more preferably substantially in line with ribs 88.

Figure 35:
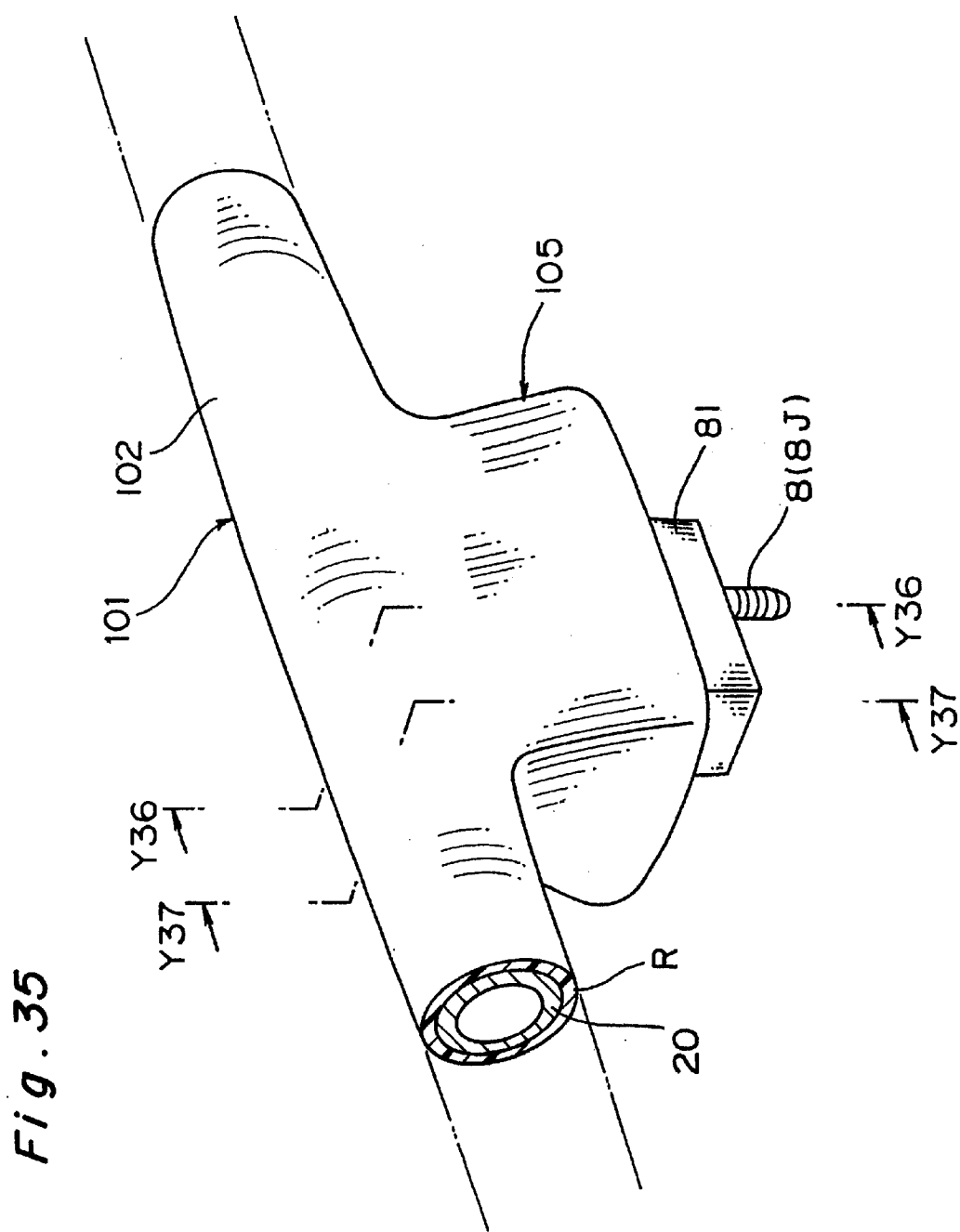
FIG. 35 is an oblique view of the roof rack center support and adjacent area insert molded according to the second embodiment of the invention.
Figure 36:
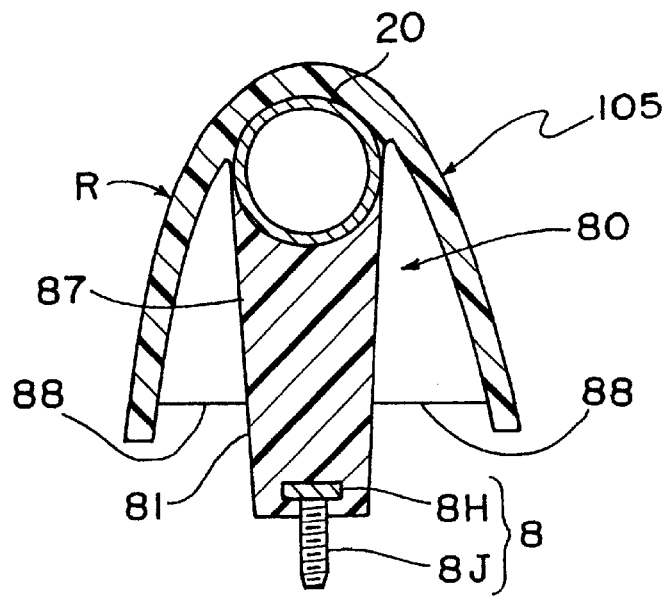
FIG. 36 is a vertical section view of the roof rack center support and adjacent area through Y36—Y36 in FIG. 35.
Figure 37:
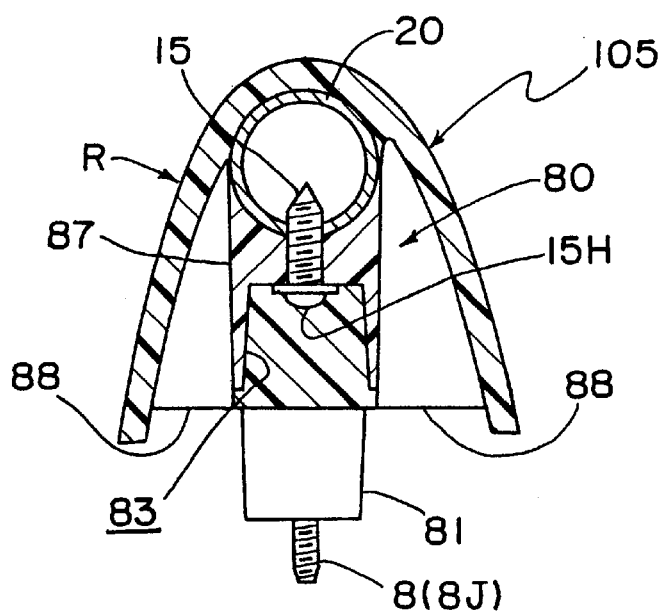
FIG. 37 is a vertical section view of the roof rack center support and adjacent area through Y37—Y37 in FIG. 35.

FIGS. 35 to 37 show the center support 105 of roof rack 101 and the adjacent area.

As will be known from these figures, a uniform resin coating R is formed in all parts of the roof rack 101 coating R, including that part corresponding to the end part of mold cavity CM2 farthest from gate 78 (also seen on the left side in FIGS. 36 and 37). In other words, the mold cavity is still filled uniformly with resin during the molding process.

It should be noted that except for the ribs 88 of center support bracket core 80, core body 87 is in contact with the inside surface of walls 118 of first insert 110 during insert molding and is therefore not covered with resin. As a result, center support 105 remains compact and lightweight. Furthermore, because recess 83 of center support bracket core 80 is also filled with resin, head 15H of self-tapping screw 15 is also covered with resin (see FIG. 37).

As described above, by providing a plurality of ribs 88 connecting center support bracket core body 87 and coating resin layer R, which is the outside wall of roof rack 101, the center support bracket core 80 can be made compact and light while assuring the strength and rigidity required in roof rack 101, and an accordingly lightweight roof rack 101 can therefore be achieved.

Furthermore, because the molding cavity part corresponding to ribs 88 is, preferably directly, connected with resin supply runner 79, 121g when seen in vertical section perpendicular to the longitudinal axis of rail core 20, mold cavity CM2 can be supplied and filled with molten resin from this area during insert molding. Sufficient bonding strength can therefore also be assured between ribs 88 and coating resin layer R as the outside wall of roof rack 101, and the strength and rigidity of the support can therefore be improved.

Yet further, because ribs 88 are disposed integrally to and projecting out from the center support bracket core body 87, the thickness of these ribs 88 will not adversely affect the appearance of the outside wall of roof rack 101. That is, when thick ribs 88 are used as reinforcement to improve the rigidity of the outside wall of roof rack 101, the thickness of the ribs 88 will not cause sink marks to form where the ribs 88 connect to the outside wall of roof rack 101, and appearance defects resulting from such sink marks can thus be prevented.

Figure 39:
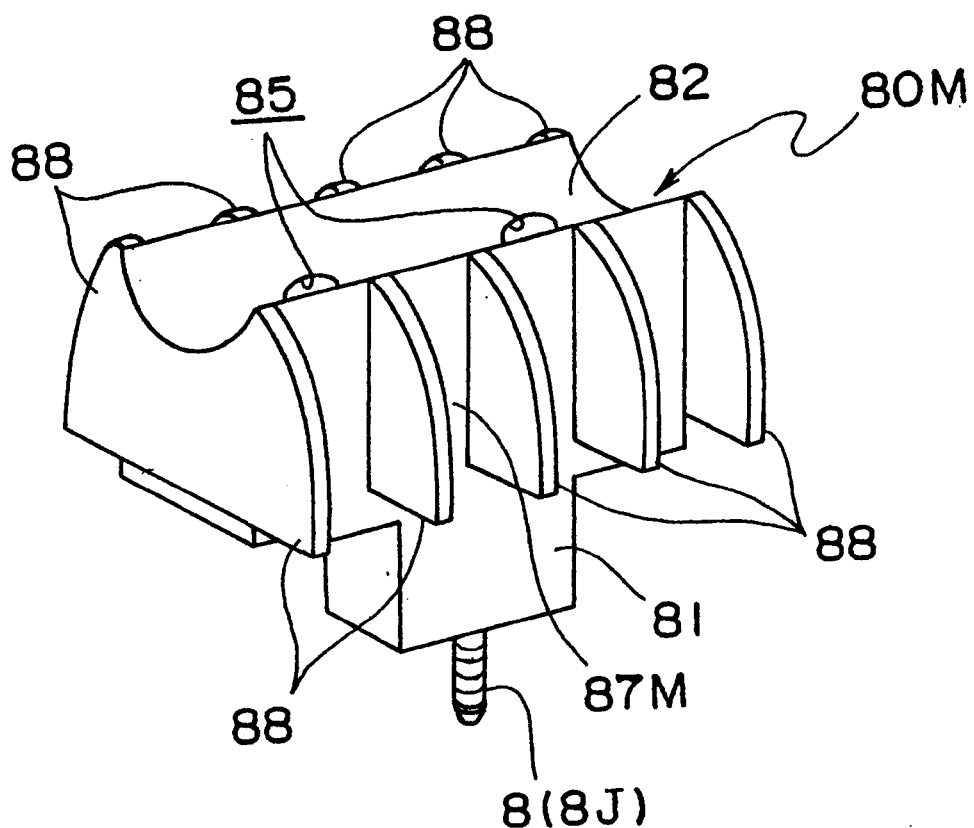
FIG. 39 is an oblique view of a center support bracket core according to an alternative version of the second embodiment.
Figure 40:
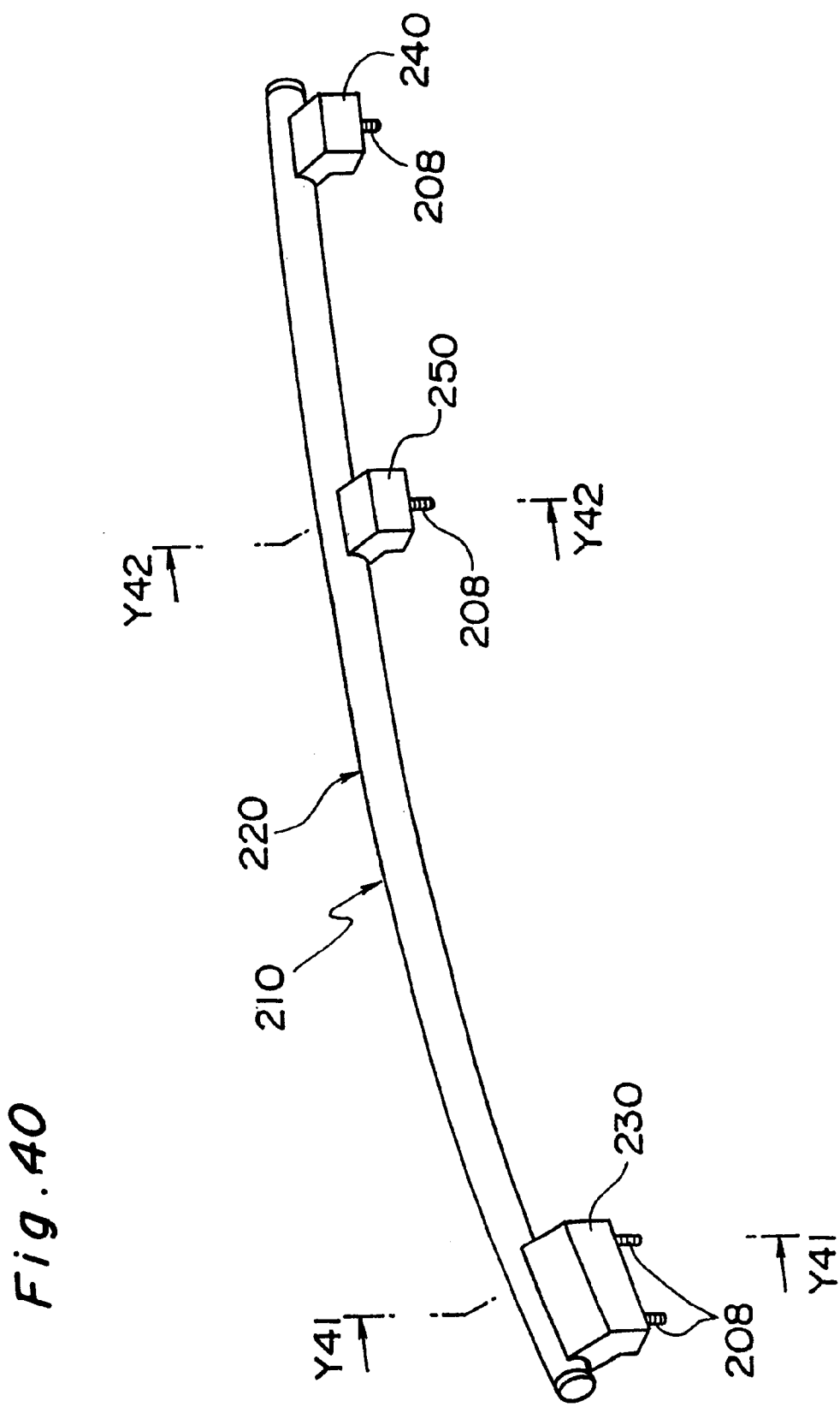
FIG. 40 is an oblique view of a roof rack core assembly according to the prior art.
Figure 41:
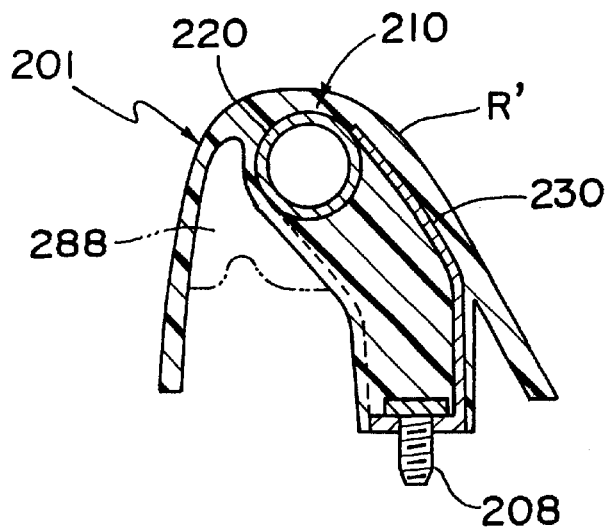
FIG. 41 is a section view of the front support bracket core through Y41—Y41 in FIG. 40.
Figure 42:
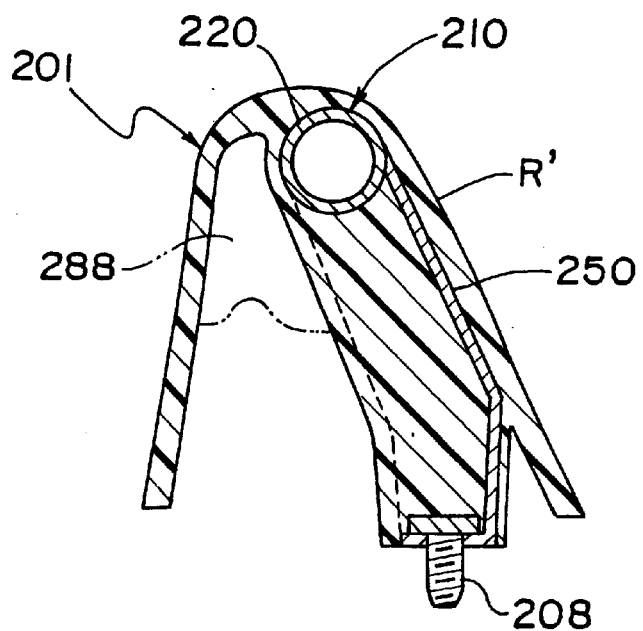
FIG. 42 is a section view of the front support bracket core through Y42—Y42 in FIG. 40.

In the second embodiment shown in FIGS. 27 to 38, the ribs 88 are provided on the front and back sides of center support bracket core body 87. As shown with center support bracket core 80M in FIG. 39, however, a plurality of ribs 88 can be provided at various points along the length of core body 87M. It will be obvious that even greater reinforcement can be achieved by providing numerous ribs 88.

It will also be obvious that while ribs 88 are described in this second embodiment as being formed integrally to the core body 87, 87M of center support bracket core 80, 80M, these ribs can also be formed integrally with the resin coating R during insert molding of roof rack 101.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A vehicle roof rack having a vehicle mounting bracket and a rack rail extending longitudinally to the vehicle body on top of the vehicle roof, the roof rack being formed by placing a core in a specific location inside a mold cavity and injecting molten resin to the mold cavity to form a synthetic resin coating on at least a specific surface area of the core, wherein:

said core includes a rail core as the core of the rack rail, and a support bracket core as the core of the mounting bracket, and said support bracket core is integrally molded from synthetic resin to include a mechanism for fastening the support bracket core to the rail core and a mechanism for fastening the roof rack to the vehicle.

2. A vehicle roof rack as described in claim 1, wherein the mechanism for fastening the support bracket core to the rail core is a through-hole through which a threaded member is passed to fasten the support bracket core to the rail core, and the mechanism for fastening the roof rack to the vehicle is a bolt having a threaded shaft protruding from a support bracket core base bottom that is fastened to the vehicle roof.

3. A vehicle roof rack as described in claim 2, wherein a recess is formed to a specific depth from a specific bottom reference surface of the support bracket core, said through-hole is formed in a inside wall of the recess, and said recess communicating with a resin supply runner of a molding die.

4. A vehicle roof rack as described in claim 1, wherein the support bracket core is held in the mold using an insert, and a resin path is also formed in part where the support bracket core and insert contact, said resin path connecting end parts of a mold cavity nearest and farthest from the resin supply runner when seen in vertical section perpendicular to the longitudinal axis of the rail core, and said mold cavity formed between an outside surface of the support bracket core and an inside surface of the molding die.

5. A vehicle roof rack having a vehicle mounting bracket and a rack rail extending longitudinally to the vehicle body on top of the vehicle roof, the roof rack being formed by placing a core in a specific location inside a mold cavity and injecting molten resin to the mold cavity to form a synthetic resin coating on at least a specific surface area of the core, wherein:

said core includes a rail core as the core of the rack rail, and a support bracket core made of synthetic resin as the core of the mounting bracket;

a plurality of ribs is disposed connecting a support bracket core body and a coating resin layer as an outside wall of the roof rack; and a mold cavity part corresponding to the ribs as seen in vertical section perpendicular to the longitudinal axis of the rail core communicates with the resin supply runner part of the molding die.

6. A vehicle roof rack as described in claim 5, wherein said ribs are formed integrally to and projecting out from the support bracket core body.

* * * * *